United States Patent
Rawdon et al.

(10) Patent No.: US 9,541,118 B2
(45) Date of Patent: Jan. 10, 2017

(54) SYSTEMS AND METHODS FOR USE IN COVERING A PORTION OF A FASTENER PROTRUDING FROM A SURFACE

(71) Applicant: The Boeing Company, Seal Beach, CA (US)

(72) Inventors: Blaine Knight Rawdon, San Pedro, CA (US); Michael Scott Cameron, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 14/034,114

(22) Filed: Sep. 23, 2013

(65) Prior Publication Data
US 2015/0082603 A1  Mar. 26, 2015

(51) Int. Cl.
*F16B 37/14* (2006.01)
*B64D 45/02* (2006.01)

(52) U.S. Cl.
CPC ............... *F16B 37/14* (2013.01); *B64D 45/02* (2013.01); *Y10T 29/49826* (2015.01); *Y10T 29/49876* (2015.01); *Y10T 29/49888* (2015.01)

(58) Field of Classification Search
CPC .......... F16B 37/14; F16B 37/145; F16B 39/08
USPC .................... 411/372.5, 372.6, 373, 374, 429
See application file for complete search history.

(56) References Cited

U.S. PATENT DOCUMENTS

| | | | |
|---|---|---|---|
| 1,254,514 A | 1/1918 | Lehmann | |
| 1,904,263 A * | 4/1933 | Berge | F16B 37/14 411/135 |
| 2,288,710 A * | 7/1942 | Hotchkin | F16B 37/02 411/374 |
| 2,334,046 A * | 11/1943 | Tinnerman | F16B 37/02 411/374 |
| 2,475,446 A * | 7/1949 | Cohen | A45B 25/18 135/33.6 |
| 2,819,642 A * | 1/1958 | Refrigeri | F16B 37/14 411/373 |
| 3,241,427 A * | 3/1966 | Bosler | F16B 37/14 4/252.1 |
| 3,362,280 A * | 1/1968 | Muller | F16B 21/073 215/317 |
| 3,470,787 A * | 10/1969 | Mackie | F16B 33/004 264/250 |
| 3,485,134 A | 12/1969 | Ott | |

(Continued)

FOREIGN PATENT DOCUMENTS

| | | |
|---|---|---|
| DE | 3218466 C1 | 4/1983 |
| EP | 2610506 A1 | 7/2013 |

(Continued)

OTHER PUBLICATIONS

Extended European Search Report for Application No. 14175808.6; Mar. 17, 2015; 7 pages.

(Continued)

*Primary Examiner* — Roberta Delisle
(74) *Attorney, Agent, or Firm* — Armstrong Teasdale LLP

(57) ABSTRACT

A system for use in covering a portion of a fastener protruding from a surface is provided. The system includes a cap that includes an interior, a base that at least partially delimits the interior, and pawls on the interior. The system may also include a tooth configured to be associated with the fastener and configured to positively engage the pawls.

20 Claims, 19 Drawing Sheets

(56) References Cited

U.S. PATENT DOCUMENTS

| | | | | |
|---|---|---|---|---|
| 3,548,704 | A | * 12/1970 | Kutryk | F16B 37/14 411/373 |
| 3,827,110 | A | 8/1974 | Dzus et al. | |
| 4,214,505 | A | 7/1980 | Aimar | |
| 4,295,766 | A | 10/1981 | Shaw | |
| 4,400,123 | A | 8/1983 | Dunegan | |
| 4,519,974 | A | 5/1985 | Bravenec et al. | |
| 4,579,493 | A | * 4/1986 | Schaty | F16B 37/0842 24/104 |
| 4,601,624 | A | 7/1986 | Hill | |
| 4,659,273 | A | * 4/1987 | Dudley | F16B 41/005 411/373 |
| 4,749,321 | A | 6/1988 | Knohl et al. | |
| 4,784,555 | A | * 11/1988 | Cantrell | F16B 37/14 403/372 |
| 4,828,444 | A | * 5/1989 | Oshida | F16B 37/043 411/437 |
| 4,850,778 | A | * 7/1989 | Clough | F16B 37/0842 411/182 |
| 4,971,745 | A | 11/1990 | Ferenc et al. | |
| 5,082,409 | A | * 1/1992 | Bias | F16B 37/14 411/372.5 |
| 5,098,242 | A | * 3/1992 | Schaty | F16B 37/0842 411/339 |
| 5,163,797 | A | * 11/1992 | Patti | B60B 7/00 411/372.6 |
| 5,302,070 | A | * 4/1994 | Kameyama | F16B 37/0842 411/437 |
| 5,350,266 | A | 9/1994 | Espey et al. | |
| 5,480,273 | A | 1/1996 | Jou | |
| 5,642,973 | A | * 7/1997 | Pretty | F16B 37/14 411/373 |
| 5,651,651 | A | 7/1997 | Spencer | |
| 5,879,117 | A | 3/1999 | Chen et al. | |
| 5,988,966 | A | 11/1999 | Chen et al. | |
| 6,135,691 | A | 10/2000 | Nadarajah et al. | |
| 6,238,158 | B1 | 5/2001 | Clements | |
| 6,381,806 | B1 | 5/2002 | Stanesic et al. | |
| 6,802,681 | B2 | * 10/2004 | Cheal | F16B 5/02 411/429 |
| 6,964,549 | B2 | 11/2005 | Fallon | |
| 7,658,580 | B1 | 2/2010 | Conway et al. | |
| 7,891,151 | B2 | * 2/2011 | Sano | B62D 25/2072 296/97.23 |
| 8,210,785 | B1 | 7/2012 | Gager | |
| 8,333,537 | B2 | 12/2012 | Rogers et al. | |
| 2002/0192052 | A1 | * 12/2002 | Ruspa | F16B 37/14 411/431 |
| 2005/0079034 | A1 | 4/2005 | Maas | |
| 2008/0232927 | A1 | 9/2008 | Trimble | |
| 2013/0186552 | A1 | 7/2013 | Asahara et al. | |

FOREIGN PATENT DOCUMENTS

| | | |
|---|---|---|
| GB | 612381 A | 11/1948 |
| GB | 936093 A | 9/1963 |
| GB | 1239839 A | 7/1971 |
| JP | 02102910 | 4/1990 |
| JP | 2000039010 | 8/2000 |
| WO | 2009063063 A1 | 5/2009 |

OTHER PUBLICATIONS

Extended European Search Report of Application No. 14185995.9; Mar. 11, 2015; 6 pages.

Canada Office Action for related Application No. 2,856,687 dated Jul. 21, 2015; 4 pp.

Canada Office Action for related Application No. 2,858,461 dated Jul. 28, 2015; 4 pp.

Canada Examination Report for related matter 2,858,461 dated Apr. 8, 2016; 3 pp.

Extended European Search Report for Application No. 16170221.2 dated Sep. 8, 2016; 7 pp.

Extended European Search Report for Application No. 16170222.0 dated Sep. 9, 2016; 8 pp.

* cited by examiner

SYSTEMS AND METHODS FOR USE IN COVERING A PORTION OF A FASTENER PROTRUDING FROM A SURFACE

BACKGROUND

Various structures are assembled using a plurality of fasteners. Some protruding fasteners may need to be covered with insulating caps that require internal and external application of sealant to inhibit electromagnetic energy and/or hot particles from being discharged from the fasteners. Existing methodologies of covering protruding fasteners with caps requiring application of sealant are labor-intensive and time-consuming.

SUMMARY

Accordingly, systems and methods for use in covering a portion of a fastener protruding from a surface, intended to address the above-identified concerns, would find utility.

One example of the present disclosure relates to a system for use in covering a portion of a fastener protruding from a surface. The system includes a cap that includes an interior, a base that at least partially delimits the interior, and pawls on the interior.

In one aspect of the disclosure, which may include at least a portion of the subject matter of any of the preceding and/or following examples and aspects, the system also includes a tooth configured to be associated with the fastener and configured to positively engage the pawls.

In one aspect of the disclosure, which may include at least a portion of the subject matter of any of the preceding and/or following examples and aspects, the tooth includes a tapered surface facing away from a head of the fastener.

In one aspect of the disclosure, which may include at least a portion of the subject matter of any of the preceding and/or following examples and aspects, the tooth is configured to threadably engage the fastener.

In one aspect of the disclosure, which may include at least a portion of the subject matter of any of the preceding and/or following examples and aspects, the system also includes a nut configured to be coupled to the fastener, wherein the nut includes the tooth.

In one aspect of the disclosure, which may include at least a portion of the subject matter of any of the preceding and/or following examples and aspects, the tooth is delimited on one side by a groove formed in an outer surface of the nut.

In one aspect of the disclosure, which may include at least a portion of the subject matter of any of the preceding and/or following examples and aspects, the system also includes a collar configured to be coupled to the fastener and a retainer configured to couple the collar to the fastener. In this aspect, the collar includes the tooth.

In one aspect of the disclosure, which may include at least a portion of the subject matter of any of the preceding and/or following examples and aspects, the tooth is configured to be coupled to the fastener with an interference fit.

In one aspect of the disclosure, which may include at least a portion of the subject matter of any of the preceding and/or following examples and aspects, the tooth is integrally formed with the fastener.

In one aspect of the disclosure, which may include at least a portion of the subject matter of any of the preceding and/or following examples and aspects, the tooth and the surface are separated by a space.

In one aspect of the disclosure, which may include at least a portion of the subject matter of any of the preceding and/or following examples and aspects, the tooth positively engages the pawls is configured to be loaded in compression against the tooth.

In one aspect of the disclosure, which may include at least a portion of the subject matter of any of the preceding and/or following examples and aspects, each of the pawls includes a first end proximal to the base and a second end distal from the base.

In one aspect of the disclosure, which may include at least a portion of the subject matter of any of the preceding and/or following examples and aspects, the second end has a greater width than the first end.

In one aspect of the disclosure, which may include at least a portion of the subject matter of any of the preceding and/or following examples and aspects, the pawls are configured to be loaded in tension against the tooth.

In one aspect of the disclosure, which may include at least a portion of the subject matter of any of the preceding and/or following examples and aspects, each of the pawls includes a first end distal from the base and a second end extending toward the base.

In one aspect of the disclosure, which may include at least a portion of the subject matter of any of the preceding and/or following examples and aspects, the cap also includes a seal coupled to the base to engage the surface.

In one aspect of the disclosure, which may include at least a portion of the subject matter of any of the preceding and/or following examples and aspects, the seal is configured to bias the pawls against the tooth.

In one aspect of the disclosure, which may include at least a portion of the subject matter of any of the preceding and/or following examples and aspects, the cap also includes a wall that at least partially delimits the interior and at least one port that extends through the wall.

In one aspect of the disclosure, which may include at least a portion of the subject matter of any of the preceding and/or following examples and aspects, the at least one port includes an injection port configured to receive sealant therethrough and a bleed port configured to allow air to escape from the interior.

In one aspect of the disclosure, which may include at least a portion of the subject matter of any of the preceding and/or following examples and aspects, the injection port has a larger diameter than a diameter of the bleed port.

One example of the present disclosure relates to a method that includes providing a fastener that includes a tooth. A portion of the fastener protrudes from a surface. The method also includes providing a cap that includes a wall, a base, an interior at least partially delimited by the wall and the base, and pawls on the interior; covering the portion of the fastener with the cap; and positively engaging the pawls with the tooth.

In one aspect of the disclosure, which may include at least a portion of the subject matter of any of the preceding and/or following examples and aspects, positively engaging the pawls with the tooth includes loading the pawls in compression against the tooth.

In one aspect of the disclosure, which may include at least a portion of the subject matter of any of the preceding and/or following examples and aspects positively engaging the pawls with the tooth includes loading the pawls in tension against the tooth.

In one aspect of the disclosure, which may include at least a portion of the subject matter of any of the preceding and/or following examples and aspects, positively engaging the pawls with the tooth includes elastically deforming the pawls relative to the tooth prior to positively engaging the pawls with the tooth.

In one aspect of the disclosure, which may include at least a portion of the subject matter of any of the preceding and/or following examples and aspects, positively engaging the pawls with the tooth includes biasing the pawls against the tooth.

In one aspect of the disclosure, which may include at least a portion of the subject matter of any of the preceding and/or following examples and aspects, providing the fastener that includes the tooth includes coupling the tooth to the fastener.

In one aspect of the disclosure, which may include at least a portion of the subject matter of any of the preceding and/or following examples and aspects, coupling the tooth to the fastener includes threadably engaging the tooth with the fastener.

In one aspect of the disclosure, which may include at least a portion of the subject matter of any of the preceding and/or following examples and aspects, coupling the tooth to the fastener includes coupling the tooth to the fastener with a retainer.

In one aspect of the disclosure, which may include at least a portion of the subject matter of any of the preceding and/or following examples and aspects, coupling the tooth to the fastener includes locating the tooth proximal to the surface.

In one aspect of the disclosure, which may include at least a portion of the subject matter of any of the preceding and/or following examples and aspects, coupling the tooth to the fastener includes locating the tooth distal from the surface.

In one aspect of the disclosure, which may include at least a portion of the subject matter of any of the preceding and/or following examples and aspects, providing the fastener that includes the tooth includes integrally forming the tooth with the fastener.

In one aspect of the disclosure, which may include at least a portion of the subject matter of any of the preceding and/or following examples and aspects, the cap includes at least one port extending through the wall.

In one aspect of the disclosure, which may include at least a portion of the subject matter of any of the preceding and/or following examples and aspects, the at least one port is a single port.

In one aspect of the disclosure, which may include at least a portion of the subject matter of any of the preceding and/or following examples and aspects, the method also includes sealing the base against the surface, creating a vacuum in the interior, and injecting a sealant into the interior.

In one aspect of the disclosure, which may include at least a portion of the subject matter of any of the preceding and/or following examples and aspects, creating the vacuum in the interior includes withdrawing air from the interior through the single port.

In one aspect of the disclosure, which may include at least a portion of the subject matter of any of the preceding and/or following examples and aspects, injecting a sealant includes injecting a predetermined amount of sealant into the interior through the single port.

In one aspect of the disclosure, which may include at least a portion of the subject matter of any of the preceding and/or following examples and aspects, injecting a predetermined amount of sealant includes determining the predetermined amount of sealant based on a vacant volume of the interior.

In one aspect of the disclosure, which may include at least a portion of the subject matter of any of the preceding and/or following examples and aspects, the method also includes discontinuing to inject the sealant upon detection of a predetermined back pressure at single port.

In one aspect of the disclosure, which may include at least a portion of the subject matter of any of the preceding and/or following examples and aspects, the method also includes sealing the base against the surface, injecting a sealant into the interior through the at least one port, and allowing air to escape from the interior through the at least one port.

In one aspect of the disclosure, which may include at least a portion of the subject matter of any of the preceding and/or following examples and aspects, the at least one port includes an injection port and a bleed port.

In one aspect of the disclosure, which may include at least a portion of the subject matter of any of the preceding and/or following examples and aspects, the sealant is injected into the interior through the injection port and the air escapes from the interior through the bleed port.

One example of the present disclosure relates to a method of packaging a cap for use in covering a portion of a fastener protruding from a surface. The cap includes an interior having a surface. The method includes providing the cap that is generally clean to facilitate adhesion of a sealant to the interior surface and encapsulating at least a portion of the cap.

In one aspect of the disclosure, which may include at least a portion of the subject matter of any of the preceding and/or following examples and aspects, encapsulating at least a portion of the cap includes encapsulating the interior of the cap.

In one aspect of the disclosure, which may include at least a portion of the subject matter of any of the preceding and/or following examples and aspects, encapsulating the interior of the cap includes providing the cap with a base that at least partially delimits the interior and coupling a film seal to the base, In one aspect of the disclosure, which may include at least a portion of the subject matter of any of the preceding and/or following examples and aspects, encapsulating at least a portion of the cap includes encapsulating the cap entirely within a sealed container.

One example of the present disclosure relates to a system for use in covering a portion of a fastener selected from fasteners protruding from surfaces in a plurality of orientations. The system includes collections of caps. Each collection is associated with one of the plurality of orientations. The caps in each collection differ from the caps in other collections in at least one feature.

In one aspect of the disclosure, which may include at least a portion of the subject matter of any of the preceding and/or following examples and aspects, the at least one feature includes a location of at least one port formed in each of the caps.

In one aspect of the disclosure, which may include at least a portion of the subject matter of any of the preceding and/or following examples and aspects, a unique identifier is associated with each collection of caps.

In one aspect of the disclosure, which may include at least a portion of the subject matter of any of the preceding and/or following examples and aspects, the unique identifier is a color.

One example of the present disclosure relates to a method of covering a portion of a fastener selected from fasteners protruding from surfaces in a plurality of orientations. The method includes providing collections of caps with each collection associated with one of the plurality of orientations. The caps in each collection differ from the caps in other collections in at least one feature. The method also includes determining an orientation of the fastener, selecting a cap from a collection of caps associated with the orientation of the fastener, and covering the portion of the fastener with the cap.

In one aspect of the disclosure, which may include at least a portion of the subject matter of any of the preceding and/or following examples and aspects, covering the portion of the fastener with the cap includes positively engaging the cap with the fastener.

In one aspect of the disclosure, which may include at least a portion of the subject matter of any of the preceding and/or following examples and aspects, the method also includes associating each collection of caps with a unique identifier.

In one aspect of the disclosure, which may include at least a portion of the subject matter of any of the preceding and/or following examples and aspects, the unique identifier is a color.

In one aspect of the disclosure, which may include at least a portion of the subject matter of any of the preceding and/or following examples and aspects, the unique identifier is packaging.

One example of the present disclosure relates to a cap for use in covering a portion of a fastener protruding from a surface. The portion includes threads. The cap includes an interior, a base that at least partially delimits the interior, a threaded receptacle on the interior configured to threadably engage the portion of the fastener, and a seal coupled to the base to engage the surface.

In one aspect of the disclosure, which may include at least a portion of the subject matter of any of the preceding and/or following examples and aspects, the cap also includes an exterior partially delimited by the base and having a shape configured to be operable with a tool.

In one aspect of the disclosure, which may include at least a portion of the subject matter of any of the preceding and/or following examples and aspects, the exterior includes at least one flat surface.

In one aspect of the disclosure, which may include at least a portion of the subject matter of any of the preceding and/or following examples and aspects, the exterior includes at least one projection.

In one aspect of the disclosure, which may include at least a portion of the subject matter of any of the preceding and/or following examples and aspects, the base has a larger profile than a remainder of the cap.

One example of the present disclosure relates to a method of covering a portion of a fastener protruding from a surface. The portion includes threads. The method includes providing a cap that includes a wall, a base, an interior at least partially delimited by the wall and the base, and a threaded receptacle on the interior; threadably engaging the threaded receptacle with the portion of the fastener; and sealing the base of the cap against the surface.

In one aspect of the disclosure, which may include at least a portion of the subject matter of any of the preceding and/or following examples and aspects, the cap includes at least one port extending through the wall.

In one aspect of the disclosure, which may include at least a portion of the subject matter of any of the preceding and/or following examples and aspects, the at least one port is a single port.

In one aspect of the disclosure, which may include at least a portion of the subject matter of any of the preceding and/or following examples and aspects, the method also includes sealing the base against the surface, creating a vacuum in the interior, and injecting a sealant into the interior.

In one aspect of the disclosure, which may include at least a portion of the subject matter of any of the preceding and/or following examples and aspects, creating the vacuum in the interior includes withdrawing air from the interior through the single port.

In one aspect of the disclosure, which may include at least a portion of the subject matter of any of the preceding and/or following examples and aspects, injecting a sealant includes injecting a predetermined amount of sealant into the interior through the single port.

In one aspect of the disclosure, which may include at least a portion of the subject matter of any of the preceding and/or following examples and aspects, injecting a predetermined amount of sealant includes determining the predetermined amount of sealant based on a vacant volume of the interior.

In one aspect of the disclosure, which may include at least a portion of the subject matter of any of the preceding and/or following examples and aspects, the method also includes discontinuing to inject the sealant upon detection of a predetermined back pressure at single port.

In one aspect of the disclosure, which may include at least a portion of the subject matter of any of the preceding and/or following examples and aspects, the method also includes sealing the base against the surface, injecting a sealant into the interior through the at least one port, and allowing air to escape from the interior through the at least one port.

In one aspect of the disclosure, which may include at least a portion of the subject matter of any of the preceding and/or following examples and aspects, the at least one port includes an injection port and a bleed port.

In one aspect of the disclosure, which may include at least a portion of the subject matter of any of the preceding and/or following examples and aspects, the sealant is injected into the interior through the injection port and the air escapes from the interior through the bleed port.

One example of the present disclosure relates to a system for use in covering a portion of a fastener protruding from a surface. The system includes a cap that includes an interior, a base that at least partially delimits the interior, and at least one cam on the interior.

In one aspect of the disclosure, which may include at least a portion of the subject matter of any of the preceding and/or following examples and aspects, the system also includes at least one tab coupled to the fastener to engage the at least one cam.

In one aspect of the disclosure, which may include at least a portion of the subject matter of any of the preceding and/or following examples and aspects, the system also includes a collar configured to be coupled to the fastener. The collar includes the at least one tab.

In one aspect of the disclosure, which may include at least a portion of the subject matter of any of the preceding and/or following examples and aspects, the system also includes a retainer configured to couple the collar to the fastener.

In one aspect of the disclosure, which may include at least a portion of the subject matter of any of the preceding and/or following examples and aspects, the at least one tab is spaced a distance from the surface.

In one aspect of the disclosure, which may include at least a portion of the subject matter of any of the preceding and/or following examples and aspects, the at least one tab is angled away from the surface.

In one aspect of the disclosure, which may include at least a portion of the subject matter of any of the preceding and/or following examples and aspects, the at least one cam includes a plurality of cams.

In one aspect of the disclosure, which may include at least a portion of the subject matter of any of the preceding and/or following examples and aspects, the at least one cam extends from a surface of the interior.

In one aspect of the disclosure, which may include at least a portion of the subject matter of any of the preceding and/or following examples and aspects, the at least one cam is recessed in a surface of the interior.

In one aspect of the disclosure, which may include at least a portion of the subject matter of any of the preceding and/or following examples and aspects, the at least one cam has a tapered surface.

In one aspect of the disclosure, which may include at least a portion of the subject matter of any of the preceding and/or following examples and aspects, the tapered surface faces away from the base of the cap.

In one aspect of the disclosure, which may include at least a portion of the subject matter of any of the preceding and/or following examples and aspects, the at least one cam includes a notch to positively engage the at least one tab.

In one aspect of the disclosure, which may include at least a portion of the subject matter of any of the preceding and/or following examples and aspects, the cap also includes a wall that at least partially delimits the interior and at least one port that extends through the wall.

In one aspect of the disclosure, which may include at least a portion of the subject matter of any of the preceding and/or following examples and aspects, the at least one port includes an injection port configured to receive sealant therethrough and a bleed port configured to allow air to escape from the interior.

In one aspect of the disclosure, which may include at least a portion of the subject matter of any of the preceding and/or following examples and aspects, the cap also includes a seal coupled to the base to engage the surface.

One example of the present disclosure relates to a method of covering a portion of a fastener protruding from a surface. The method includes providing a cap that includes a wall, an interior at least partially delimited by the wall, and at least one cam on the interior. The method also includes coupling at least one tab with the fastener, covering the portion of the fastener with the cap, and rotating the cap to engage the at least one cam with the at least one tab.

In one aspect of the disclosure, which may include at least a portion of the subject matter of any of the preceding and/or following examples and aspects, rotating the cap includes positively engaging the at least one cam with the at least one tab.

In one aspect of the disclosure, which may include at least a portion of the subject matter of any of the preceding and/or following examples and aspects, the cap includes at least one port extending through the wall.

In one aspect of the disclosure, which may include at least a portion of the subject matter of any of the preceding and/or following examples and aspects, the at least one port is a single port.

In one aspect of the disclosure, which may include at least a portion of the subject matter of any of the preceding and/or following examples and aspects, the method also includes sealing the base against the surface, creating a vacuum in the interior, and injecting a sealant into the interior.

In one aspect of the disclosure, which may include at least a portion of the subject matter of any of the preceding and/or following examples and aspects, creating the vacuum in the interior includes withdrawing air from the interior through the single port.

In one aspect of the disclosure, which may include at least a portion of the subject matter of any of the preceding and/or following examples and aspects, injecting a sealant includes injecting a predetermined amount of sealant into the interior through the single port.

In one aspect of the disclosure, which may include at least a portion of the subject matter of any of the preceding and/or following examples and aspects, injecting a predetermined amount of sealant includes determining the predetermined amount of sealant based on a vacant volume of the interior.

In one aspect of the disclosure, which may include at least a portion of the subject matter of any of the preceding and/or following examples and aspects, the method also includes discontinuing to inject the sealant upon detection of a predetermined back pressure at single port.

In one aspect of the disclosure, which may include at least a portion of the subject matter of any of the preceding and/or following examples and aspects, the method also includes sealing the base against the surface, injecting a sealant into the interior through the at least one port, and allowing air to escape from the interior through the at least one port.

In one aspect of the disclosure, which may include at least a portion of the subject matter of any of the preceding and/or following examples and aspects, the at least one port includes an injection port and a bleed port.

In one aspect of the disclosure, which may include at least a portion of the subject matter of any of the preceding and/or following examples and aspects, the sealant is injected into the interior through the injection port and the air escapes from the interior through the bleed port.

DETAILED DESCRIPTION

The implementations described herein relate to systems and methods that facilitate covering portions of fasteners protruding from a surface with caps. More specifically, the systems, according to the various aspects of the disclosure, include one or more features that enable the caps to be positively engaged with the fasteners, such that the caps may be more easily installed over the fasteners. In some aspects, the caps may also include features that enable sealant to be injected inside the caps after installation thereof over the fasteners, and features that enable the caps to be removed and/or replaced with a tool. As such, the systems described herein may enable automated installation of caps over fasteners to facilitate reducing manufacturing times of associated assemblies.

Figure 1:
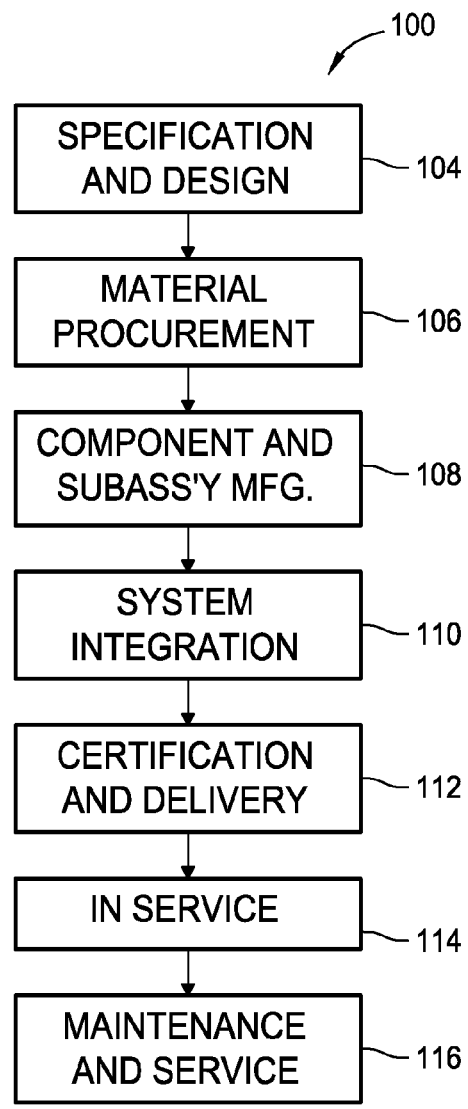
FIG. 1 is a flow diagram of an illustrative aircraft production and service methodology.
Figure 2:
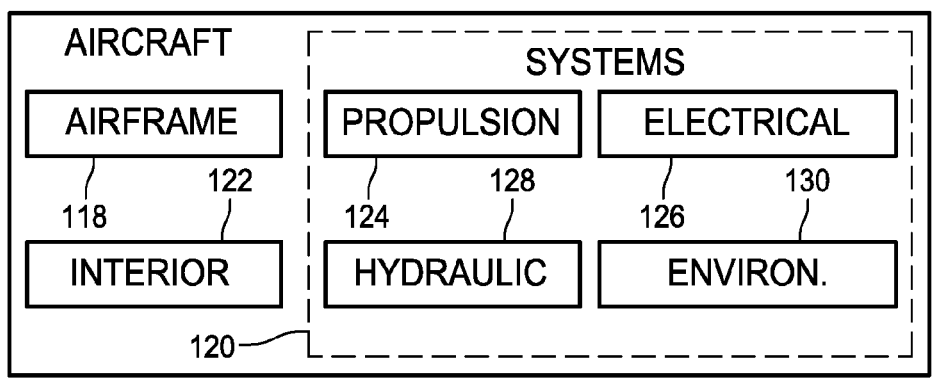
FIG. 2 is a block diagram of an illustrative aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included. Although an aircraft example is shown, the principles of the invention may be applied to non-aviation industries, such as the automotive industry.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to, airplanes, unmanned aerial vehicles (UAVs), gliders, helicopters, and/or any other object that travels through airspace.

Figure 3:
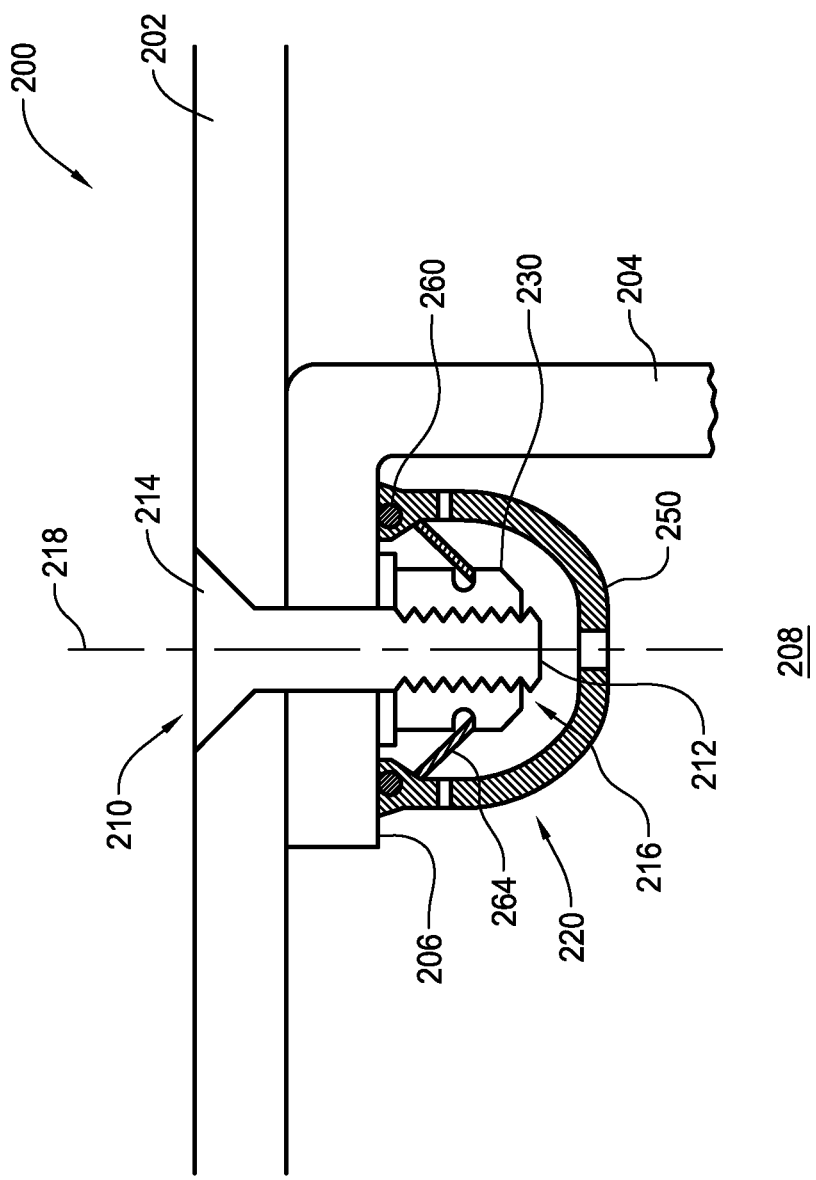
FIG. 3 is a schematic illustration of an aircraft assembly including a fastener whose protruding portion is covered using a system according to an aspect of the present disclosure.

FIG. 3 is a schematic illustration of an illustrative aircraft assembly 200 that may be associated with aircraft 102. Aircraft assembly 200 includes an outer skin 202, a stringer 204, and a fastener 210 extending through outer skin 202 and stringer 204. A portion 212 of fastener 210 protrudes from a surface 206 of stringer 204 into an interior 208 of aircraft assembly 200. In one implementation, interior 208 is configured to store fuel (not shown) therein. As such, portion 212 is covered using a system 220 to facilitate inhibiting electromagnetic discharge and/or hot particle ejection from fastener 210 and to facilitate preventing ignition of the fuel in interior 208.

Referring to FIGS. 4-14, one example of the disclosure relates to system 220 for use in covering portion 212 of fastener 210 (shown in FIG. 3). System 220 includes a tooth 230 and a cap 250. Cap 250 includes an interior 252, an exterior 254, a wall 256, a base 258, and a seal 260 coupled to base 258. Interior 252 is at least partially delimited by wall 256 and base 258. Interior 252 further includes a surface 262 and pawls 264 on surface 262 that positively engage tooth 230. As used herein, the terms "positively engage" and/or "positive engagement" means requiring more force to remove than to install. Moreover, tooth 230 includes a tapered surface 232, and at least one port 270 is formed in wall 256.

Figure 4:
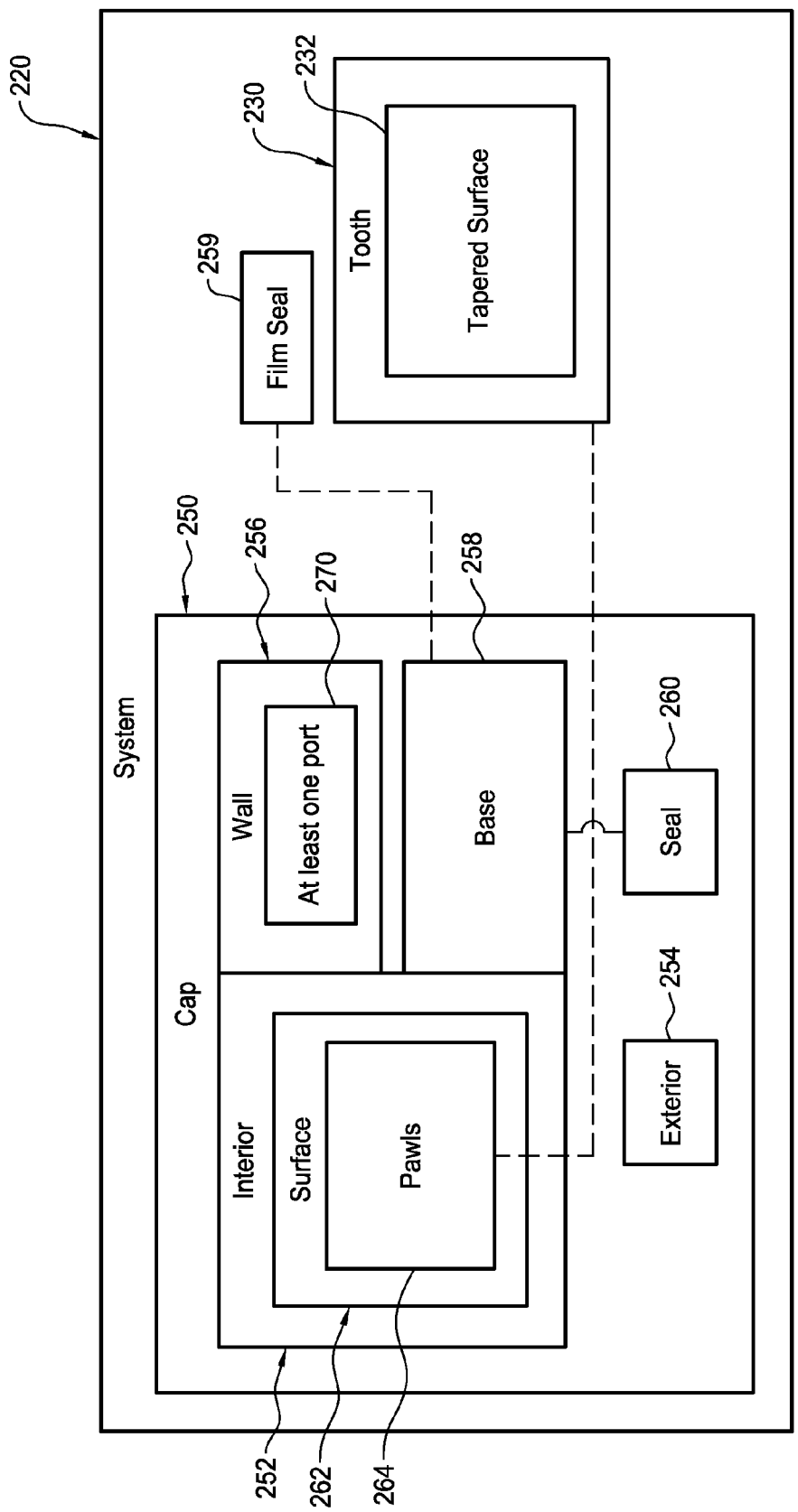
FIG. 4 is a block diagram of a system for use in covering a protruding portion of a fastener, such as that illustrated in FIG. 3, according to one aspect of the disclosure.

In FIG. 4, lines connecting various elements and/or components of system 220 may represent mechanical, electrical, fluid, optical, electromagnetic and other couplings and/or combinations thereof. Couplings other than those depicted in FIG. 4 may also exist. Dashed lines connecting the various elements and/or components of system 220 may represent couplings similar in function and purpose to those represented by solid lines; however, couplings represented by the dashed lines are either selectively provided or relate to alternative or optional aspects of the disclosure. Likewise, elements and/or components of system 220 represented in dashed lines represent alternative or optional aspects of the disclosure.

Referring, e.g. to FIGS. 4-8, system 220 includes cap 250 that includes interior 252, base 258 that at least partially delimits interior 252, and pawls 264 on interior 252. In one aspect, system 220 also includes tooth 230 configured to be associated with fastener 210 and configured to positively engage pawls 264. In one aspect, tooth 230 includes tapered surface 232 (e.g., FIG. 3) facing away from a head 214 of fastener 210. In operation, tapered surface 232 enables pawls 264 to readily slide into positive engagement with tooth 230 as cap 250 covers portion 212 of fastener 210.

Figure 8:
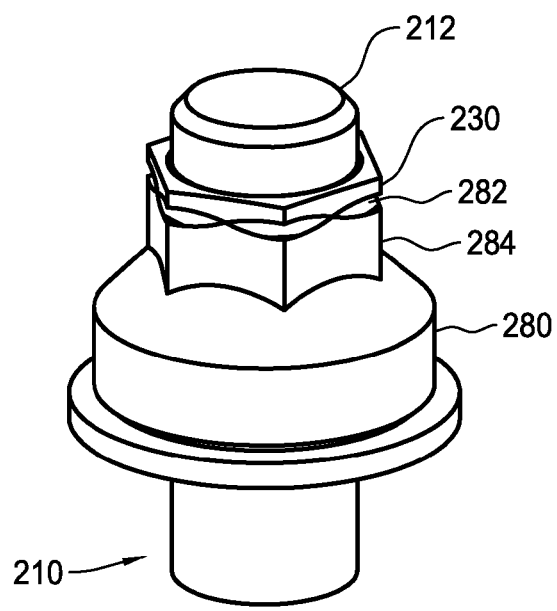
FIG. 8 is a perspective view of a tooth that may be used with the system shown in FIG. 5, according to one aspect of the disclosure.
Figure 11:
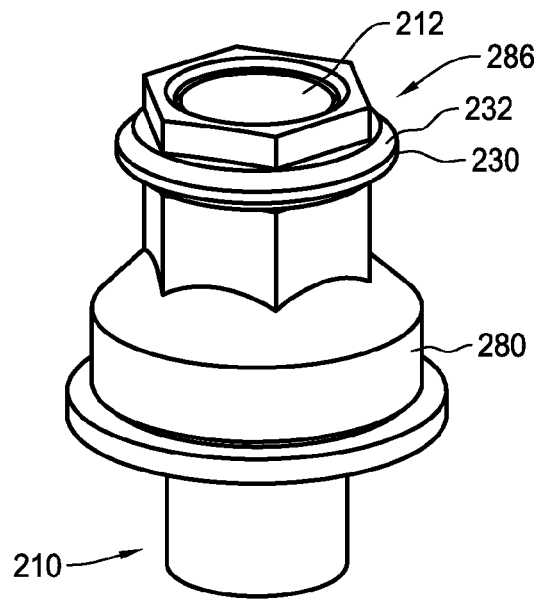
FIG. 11 is a perspective view of a tooth that may be used with the system shown in FIG. 10.

Referring to FIGS. 8 and 11, in one aspect, tooth 230 is configured to threadably engage fastener 210. Referring to FIG. 8, system 220 also includes a nut 280 configured to be coupled to fastener 210. Nut 280 includes tooth 230. In one aspect, tooth 230 is delimited on one side by a groove 282 formed in an outer surface 284 of nut 280. Alternatively, tooth 230 may be configured to be coupled to fastener 210 with an interference fit, or may be integrally formed with fastener 210.

Figure 5:
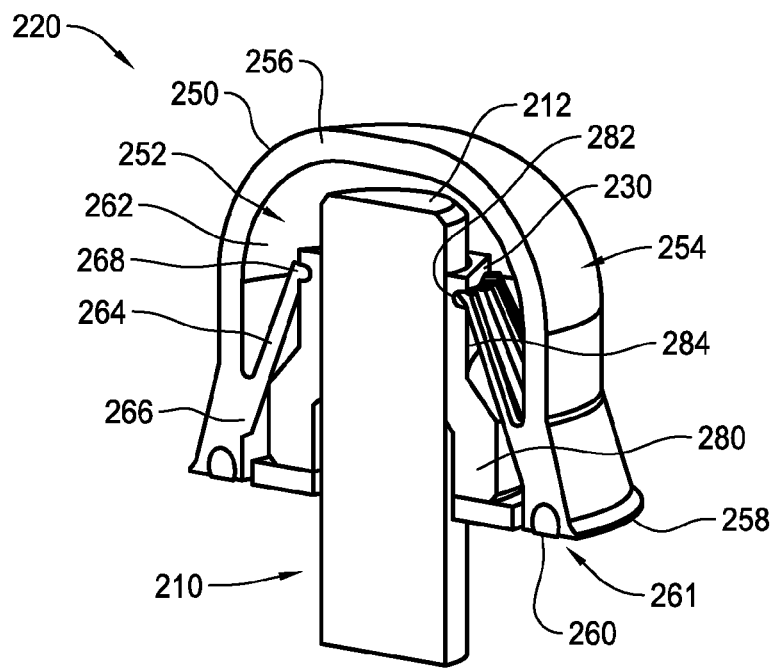
FIG. 5 is a perspective sectional view of a system for use in covering a protruding fastener, according to one aspect of the disclosure.
Figure 6:
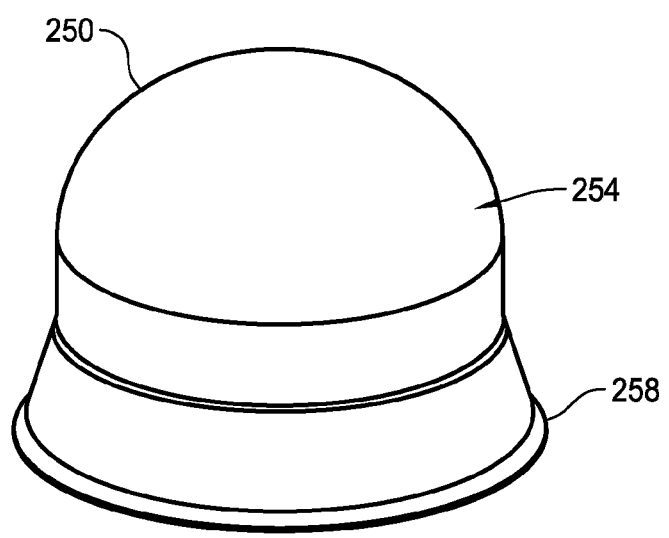
FIG. 6 is a perspective view of a cap that may be used with the system shown in FIG. 5, according to one aspect of the disclosure.
Figure 7:
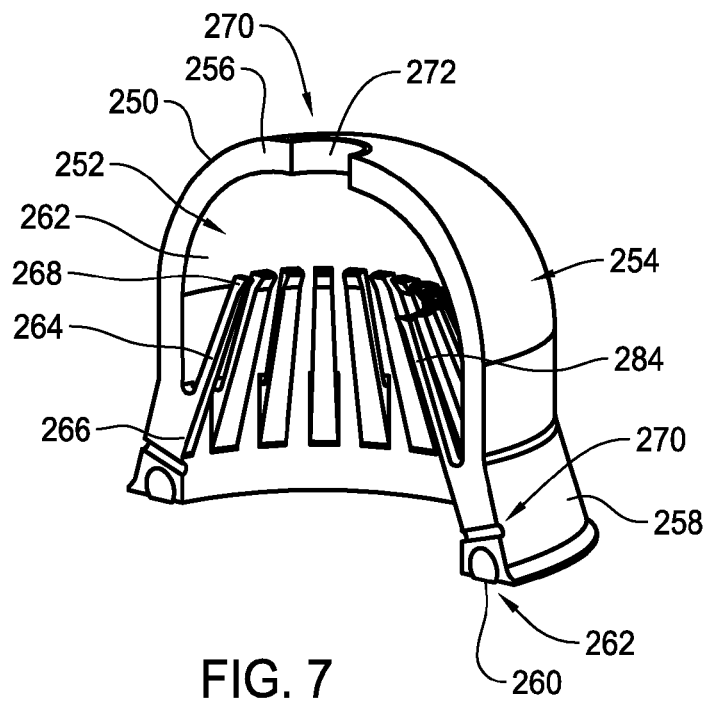
FIG. 7 is a perspective sectional view of the cap shown in FIG. 6.
Figure 9:
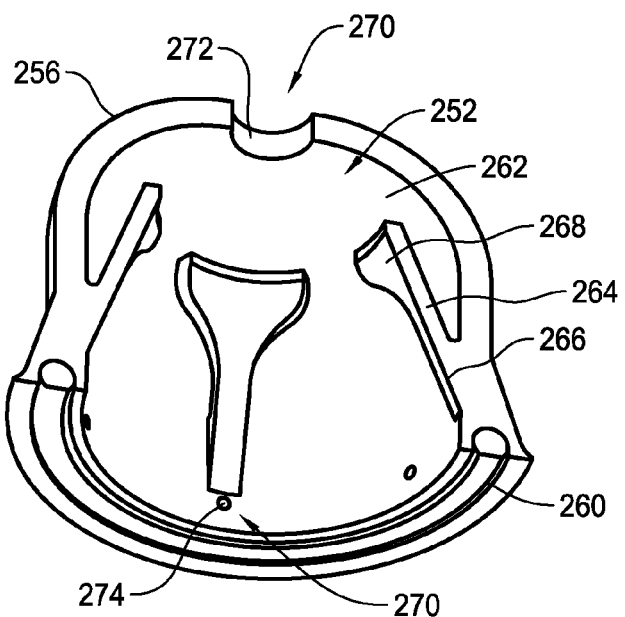
FIG. 9 is a perspective sectional view of a cap of a system for use in covering a protruding fastener, according to one aspect of the disclosure.

Referring to FIG. 5, in one aspect, tooth 230 positively engages pawls 264 that are configured to be loaded in compression against tooth 230. In one aspect, pawls 264 are spaced circumferentially about interior 252, and each of pawls 264 includes a first end 266 proximal to base 258 and a second end 268 distal from base 258. For example, first end 266 may be coupled to surface 262 of interior 252. Referring to FIG. 9, in one aspect, second end 268 has a greater width than first end 266. As such, the greater width of second end 268 facilitates reducing the number of pawls 264 required to extend substantially circumferentially about interior 252 of cap 250.

Pawls 264 may be made of any material that enables system 220 to function as described herein. More specifically, pawls 264 may be made of a flexible material to enable pawls 264 to elastically deform as cap 250 covers portion 212 of fastener 210 to facilitate engagement of tooth 230 and pawls 264. For example, pawls 264 may elastically deform radially outward from fastener 210 as cap 250 covers portion 212 of fastener 210. As such, the material and dimensions of pawls 264 are selected to enable the pawls to elastically deform in directions generally transverse to their longitudinal axes and yet to provide pawls 264 with sufficient axial stiffness to promote positive engagement of pawls 264 and tooth 210.

Figure 10:
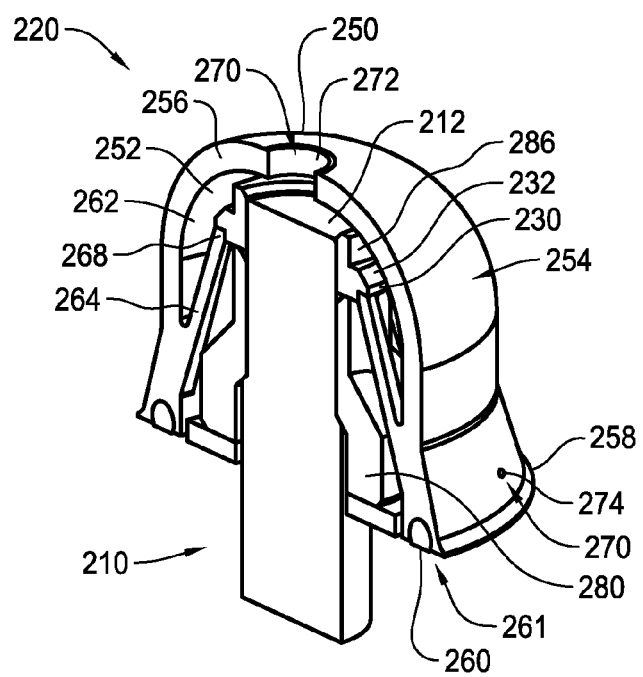
FIG. 10 is a perspective sectional view of a system for use in covering a protruding fastener, according to one aspect of the disclosure.
Figure 12:
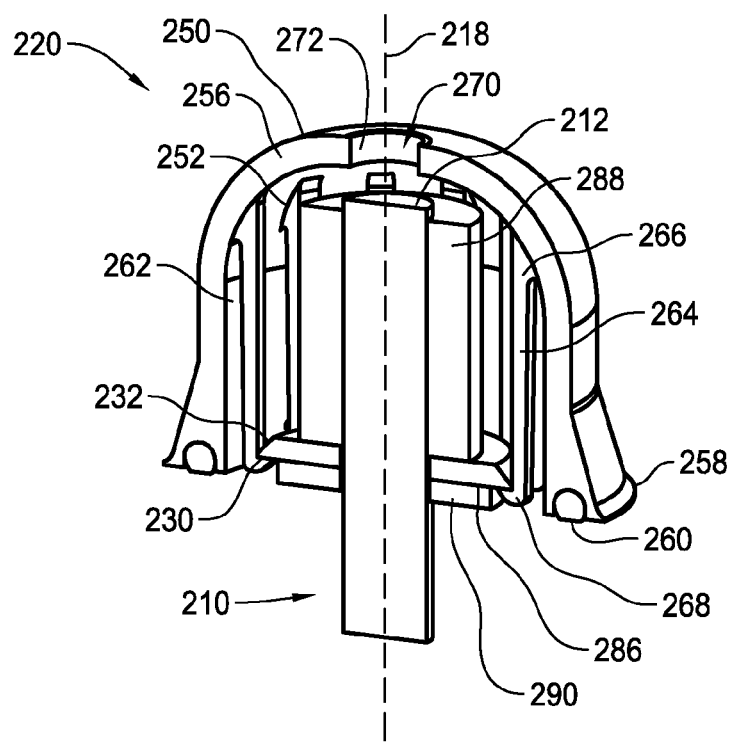
FIG. 12 is a perspective sectional view of a system for use in covering a protruding fastener, according to one aspect of the disclosure.

Referring to FIGS. 10 and 12, in one aspect, cap 250 also includes wall 256 that at least partially delimits interior 252, and at least one port 270 that extends through wall 256. In one aspect, the at least one port 270 includes an injection port 272 configured to receive sealant (not shown) therethrough and a bleed port 274 configured to allow air to escape from interior 252. Bleed port 274 enables the sealant to substantially fill interior 252 by limiting the formation of air pockets in interior 252. In one aspect, injection port 272 has a larger diameter than a diameter of bleed port 274. As such, the smaller diameter of bleed port 274 facilitates restricting sealant from being discharged therethrough as sealant is injected into and substantially fills interior 252. In an alternative implementation, wall 256 is substantially solid and does not include at least one port 270.

Cap 250 is also configured to facilitate inhibiting electromagnetic discharge and/or hot particle ejection from fastener 210 and into interior 210 of aircraft assembly 200 (shown in FIG. 3). For example, cap 250 may be formed from an electrically non-conductive material. Exemplary materials include, but are not limited to, a nylon material, a glass-filled nylon material, an epoxy material, and a glass-filled epoxy material. Further, the sealant injected into interior 252 of cap 250 and a thickness of wall 256 facilitates electrically insulating fastener 210. In an alternative implementation, the thickness of wall 256 may be selected and/or increased such that sealant may not be required to electrically insulate fastener 210. Exterior 254 of cap 250 may also have a convex shape, and/or may have a length to diameter ratio of less than about 3 to 1 to facilitate inhibiting electromagnetic discharge from fastener 210.

As described above, in one aspect, seal 260 is coupled to base 258 to engage surface 206 (shown in FIG. 3). Seal 260 may be monolithic with base 258, or may be separate from base 258 as shown in FIGS. 5, 10, and 12. Referring, e.g., to FIG. 9, in one aspect, seal 260 is received within a channel 261 formed in base 258. Alternatively, seal 260 may be coupled to base 258 by another suitable coupling mechanism and/or an adhesive.

Referring, e.g., to FIG. 3, in one aspect, seal 260 is also configured to bias pawls 264 against tooth 230. More specifically, in operation, seal 260 may be compressed between base 258 and surface 206 as cap 250 is installed to cover portion 212 of fastener 210. For example, during installation of cap 250, a force may be applied to cap 250 compressing seal 260 against surface 206 to enable engagement between second end 268 of pawls 264 and tooth 230. After the force has been removed, seal 260 expands to bias cap 250 in a direction away from surface 206 such and pawls 264 positively engage tooth 230. Seal 260 remains at least partially compressed such that cap 250 may be sealed against surface 206.

Seal 260 may be made of any material that enables system 220 to function as described herein. More specifically, seal 260 may be made of a material able to withstand prolonged use in a fuel-rich environment, and capable of maintaining its elasticity in a compressed state. An exemplary material includes, but is not limited to, a fluorosilicone material.

Figure 13:
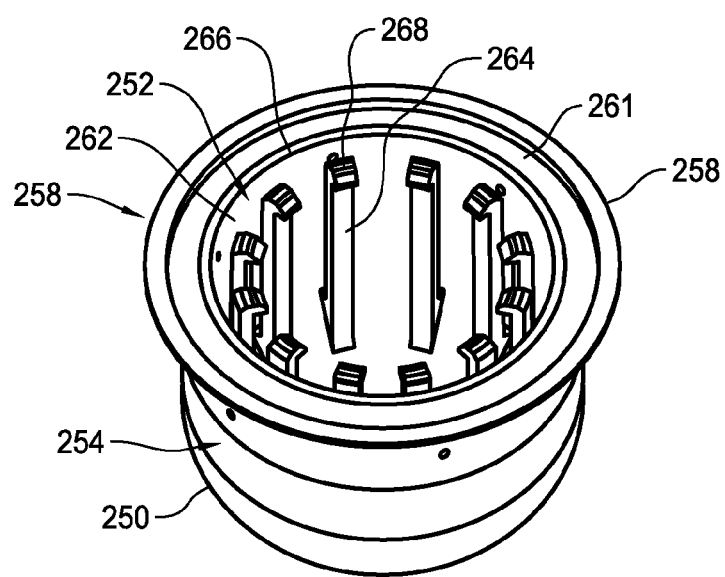
FIG. 13 is a perspective view of a cap that may be used with the system shown in FIG. 12, according to one aspect of the disclosure.
Figure 14:
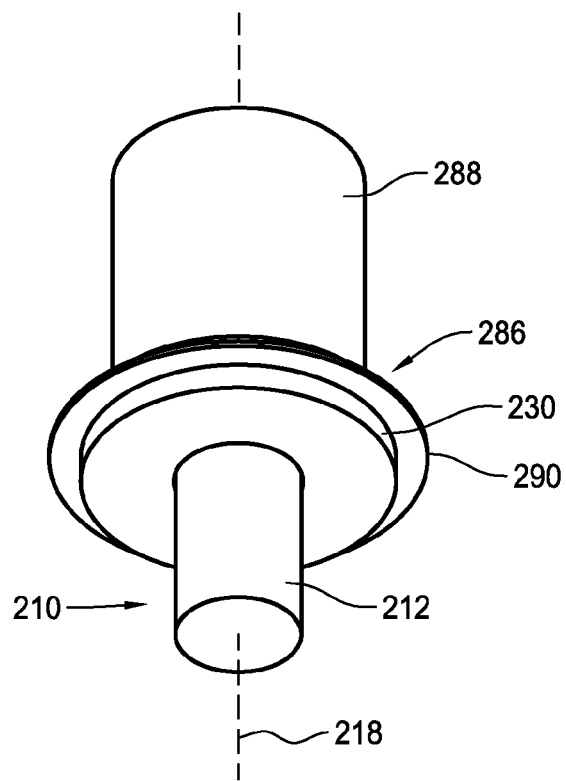
FIG. 14 is a perspective view of a tooth that may be used with the system shown in FIG. 12, according to one aspect of the disclosure.

Referring to FIGS. 10-14, in one aspect, system 220 includes a collar 286 configured to be coupled to fastener 210, wherein collar 286 includes tooth 230. In FIGS. 12-14, in one aspect, system 220 also includes a retainer 288 configured to couple collar 286 to fastener 210. More specifically, retainer 288 is coupled to portion 212 of fastener 210 with an interference fit to facilitate restricting movement of collar 286 along longitudinal axis 218 of fastener 210. System 220 also includes a spacer 290 positioned between collar 286 and surface 206 (shown in FIG. 3) such that, in one aspect, tooth 230 and surface 206 are separated by a space to facilitate engagement of pawls 264 and tooth 230.

Referring again to FIGS. 12-14, in one aspect, pawls 264 are configured to be loaded in tension against tooth 230. More specifically, in one aspect, pawls 264 include first end 266 distal from base 258 and second end 268 extending towards base 258 to positively engage tooth 230. For example, at least a portion of second end 268 extends towards base 258 to be located in the space between tooth 230 and surface 206 (FIG. 3), and to be biased into engagement with an underside of tooth 230. As such, spacer 290 has any thickness that enables pawls 264 to positively engage tooth 230.

Figure 27:
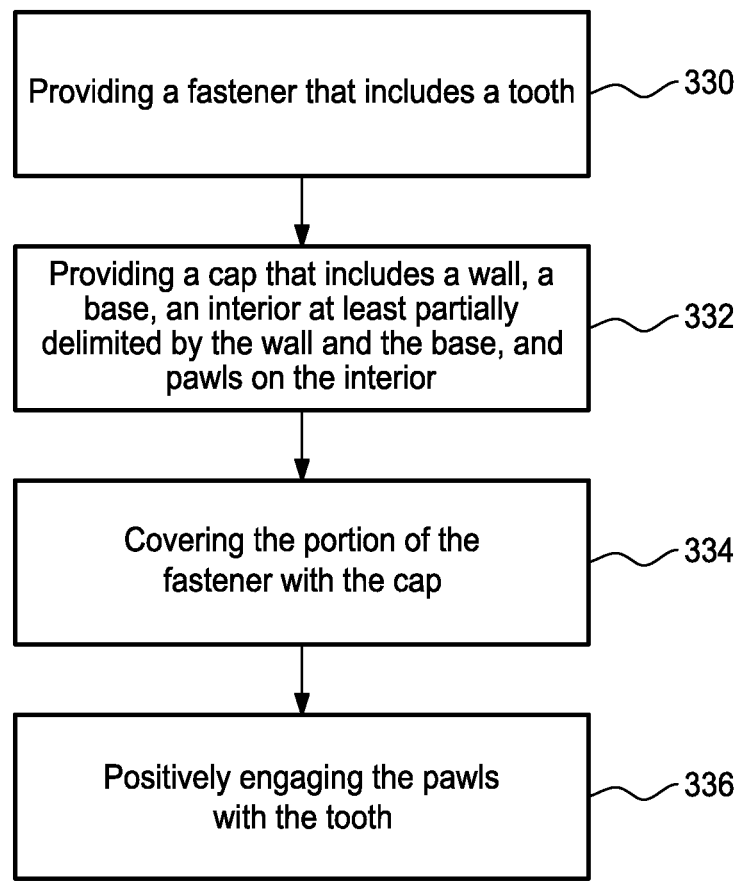
FIG. 27 is a flow diagram of an exemplary method of covering a portion of a fastener protruding from a surface.

A method (shown in FIG. 27) of covering portion 212 of fastener 210 protruding from surface 206 is also provided. The method includes providing 330 fastener 210 that includes tooth 230 and providing 332 cap 250 that includes wall 256, base 258, interior 252 at least partially delimited by wall 256 and base 258, and pawls 264 on interior 252. The method also includes covering 334 portion 212 of fastener 210 with cap 250, and positively engaging 336 pawls 264 with tooth 230.

In some aspects, the pawls 264 are either loaded in compression against tooth 230, or loaded in tension against tooth 230 to be positively engaged therewith. Further, in one aspect and as described above, positively engaging pawls 264 with tooth 230 includes elastically deforming pawls 264 relative to tooth 230 prior to positively engaging pawls 264 with tooth 230. In one aspect, positively engaging pawls 264 with tooth 230 also includes biasing pawls 264 against tooth 230 using seal 260.

In one aspect, providing fastener 210 that includes tooth 230 includes either coupling tooth 230 to fastener 210, or integrally forming tooth 230 with fastener 210. In one aspect, coupling tooth 230 to fastener 210 includes threadably engaging tooth 230 with fastener 210, or coupling tooth 230 to fastener 210 with retainer 288. Moreover, in one aspect, coupling tooth 230 to fastener 210 also includes locating tooth 230 proximal to surface 206, or locating tooth 230 distal from surface 206. More specifically, the location of tooth 230 is selected based on whether pawls 264 are to be loaded in compression or tension against tooth 230. For example, tooth 230 is located distal to surface 206 when pawls 264 are to be loaded in compression against tooth 230. Alternatively, tooth 230 may be located proximal to surface 206 when pawls 264 are to be loaded in tension against tooth 230.

As described above, in one aspect, cap 250 includes at least one port 270 extending through wall 256. In one aspect, the at least one port 270 may be a single port. In one aspect, the method also includes sealing base 258 against surface 206, creating a vacuum in interior 252, and injecting a sealant into interior 252. In one aspect, creating the vacuum in interior 252 includes withdrawing air from interior 252 through the single port. As such, withdrawing air from interior 252 enables the sealant to substantially fill interior 252 by limiting the formation of air pockets in interior 252.

In one implementation, an amount of sealant to be injected into interior 252 may be selected to prevent the use of excess sealant, to facilitate cleanup, and to promote a reduction in the weight of aircraft 102 (shown in FIG. 2). As such, in one aspect, injecting the sealant includes injecting a predetermined amount of sealant into interior 252 through the single port. More specifically, in one aspect, injecting a predetermined amount of sealant includes determining the predetermined amount of sealant for filling interior 252 based on a vacant volume of interior 252. In one aspect, the use of excess sealant is avoided by discontinuing to inject the sealant upon detection of a predetermined back pressure at the single port. The predetermined back pressure may be any suitable pressure selected to indicate that interior 252 has been substantially filled with sealant.

Alternatively, in one aspect, the method includes sealing base 258 against surface 206, injecting a sealant into interior 252 through the at least one port 270, and allowing air to escape from interior 252 through the at least one port 270. In one aspect, the at least one port includes injection port 272 and bleed port 274, and the sealant is injected into interior 252 through injection port 272 and the air escapes from interior 252 through bleed port 274. The sealant is then allowed to cure to facilitate coupling cap 250 to fastener 210.

Figure 28:
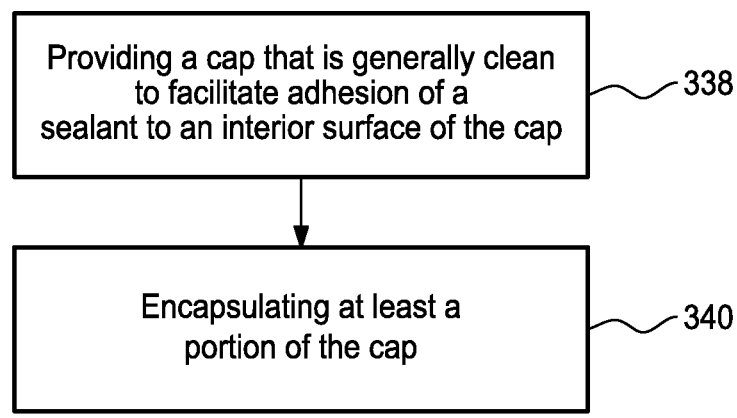
FIG. 28 is a flow diagram of an exemplary method of packaging a cap for use in covering a portion of a fastener protruding from a surface.

A method (shown in FIG. 28) of packaging cap 250 for use in covering portion 212 of fastener 210 protruding from surface 206 is also provided. Cap 250 includes interior 252 having surface 262. The method includes providing 338 cap 250 that is generally clean to facilitate adhesion of a sealant to interior surface 262, and encapsulating 340 at least a portion of cap 250. Cap 250 may be generally clean because cap 250 may be manufactured in a clean environment, and/or because interior surface 262 may be cleaned after cap 250 is manufactured.

In one aspect, encapsulating 340 at least a portion of cap 250 includes encapsulating interior 252 of cap 250, or encapsulating cap 250 entirely within a sealed container (not shown). More specifically, in one aspect, encapsulating interior 252 of cap 250 includes providing cap 250 with base 258 that at least partially delimits interior 252, and coupling a film seal 259 (shown in FIG. 4) to base 258. As such, encapsulating 340 cap 250 facilitates restricting exposure of cap 250 to contamination that may reduce adhesion of the sealant to interior surface 262. Encapsulating 340 cap 250 also facilitates reducing cap installation time by enabling a user to install cap 250 over fastener 210 without having to clean cap 250 after removing it from associated packaging.

One example of the present disclosure relates to a system for use in covering portion 212 of fastener 210 selected from fasteners protruding from surfaces in a plurality of orientations. The system includes collections of caps. Each collection is associated with one of the plurality of orientations, and the caps in each collection differ from the caps in other collections in at least one feature. In one aspect, the at least one feature may include a location of at least one port formed in each of the caps. The at least one port may include injection port 272 and bleed port 274 formed in different locations in cap 250 based on an orientation of the fastener to be covered. More specifically, the location of injection port 272 and bleed port 274 may be selected to facilitate limiting the formation of air pockets in interior 252 as sealant is injected into interior 252. For example, when cap 250 is installed, the smaller diameter bleed port 274 may be located at a higher relative elevation than injection port 272. As such, bleed port 274 remains substantially unblocked to allow air to escape from interior 252 therethrough as sealant is injected through injection port 272. Alternatively, the at least one port is a single injection port 272 located in cap 250 at a lower relative elevation than a remainder of cap 250.

In one aspect, a unique identifier is associated with each collection of caps to enable a user to easily identify which collection of caps should be used to cover a fastener protruding from a surface in a determined orientation. In one aspect, the unique identifier may be a color, and/or may be packaging associated with each collection of caps. More specifically, a different color may be associated with each collection of caps, and may be associated with the material used to form the caps and/or associated with the packaging for the caps.

Figure 30:
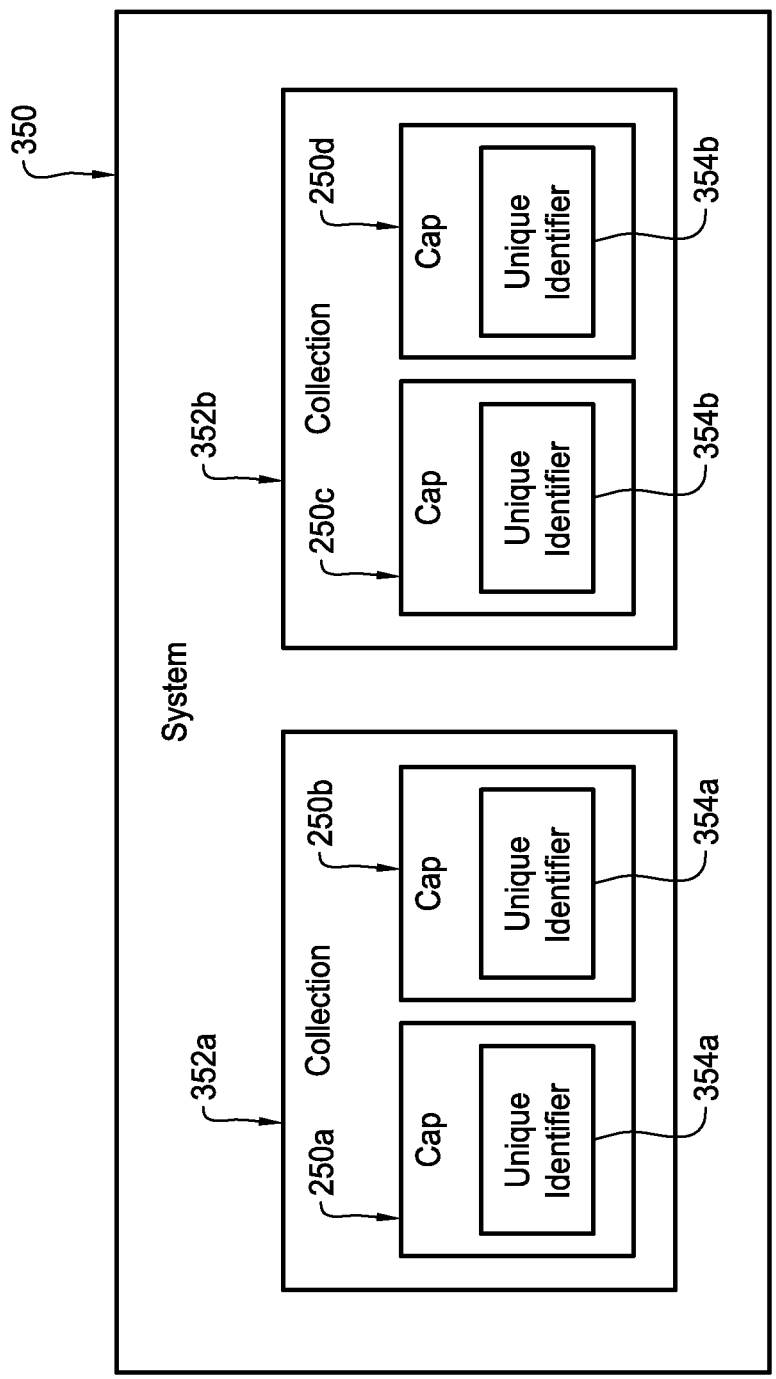
FIG. 30 is a block diagram of a system that may be used to cover a portion of the fastener shown in FIG. 3.

Referring to FIG. 30, in one aspect, a system 350 includes a first collection 352a of caps and a second collection 352b of caps. Collections 352a and 352b are for covering fasteners protruding from surfaces in a plurality of orientations, and each collection is associated with one of the plurality of orientations. In one aspect, first collection 352a includes a first cap 250a and a second cap 250b, and second collection 352b includes a first cap 250c and a second cap 250d. A unique identifier is associated with each collection. More specifically, a first unique identifier 354a is associated with first collection 352a, and a second unique identifier 354b is associated with second collection 352b. As such, in one aspect, caps 250a and 250b of first collection 352a each include first unique identifier 354a, and caps 250c and 250d of second collection 352b each include second unique identifier 354b.

Figure 29:
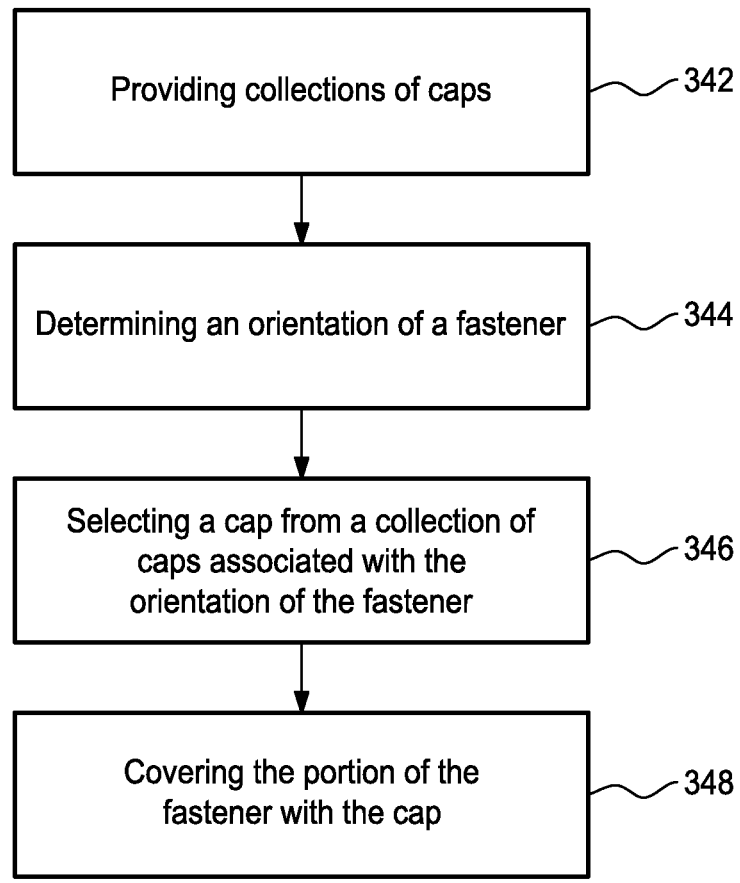
FIG. 29 is a flow diagram of an exemplary method of covering a portion of a fastener selected from fasteners protruding from surfaces in a plurality of orientations.

A method (shown in FIG. 29) of covering a portion of a fastener selected from fasteners protruding from surfaces in a plurality of orientations is also provided. The method includes providing 342 collections of caps 250, wherein each collection is associated with one of the plurality of orientations of the fasteners. As described above, the caps 250 in each collection differ from the caps in other collections in at least one feature. The method also includes determining 344 an orientation of the fastener 210, selecting 346 a cap 250 from a collection of caps 250 associated with the orientation of the fastener 210, and covering 348 the portion 212 of the fastener 210 with the cap 250.

Referring to FIGS. 15-18, one example of the disclosure relates to cap 250 for use in covering portion 212 of fastener 210 protruding from surface 206 (shown in FIG. 3). Portion 212 includes threads 216 (shown in FIG. 3). Cap 250 includes interior 252, base 258 that at least partially delimits interior 252, a threaded receptacle 292 on interior 252 configured to threadably engage portion 212 of fastener 210, and seal 260 coupled to base 258 to engage surface 206.

Figure 15:
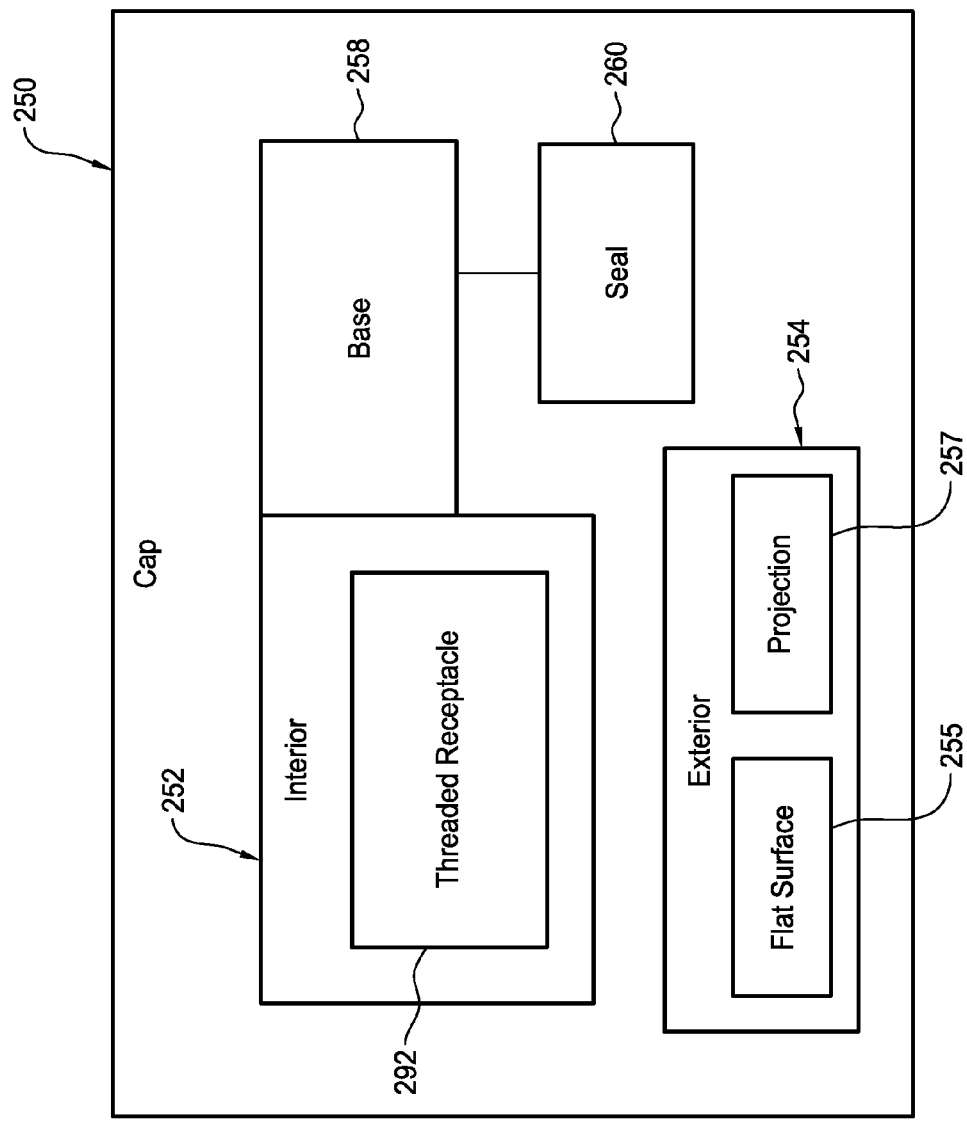
FIG. 15 is a block diagram of a cap that may be used to cover a portion of the fastener shown in FIG. 3, according to one aspect of the disclosure.
Figure 16:
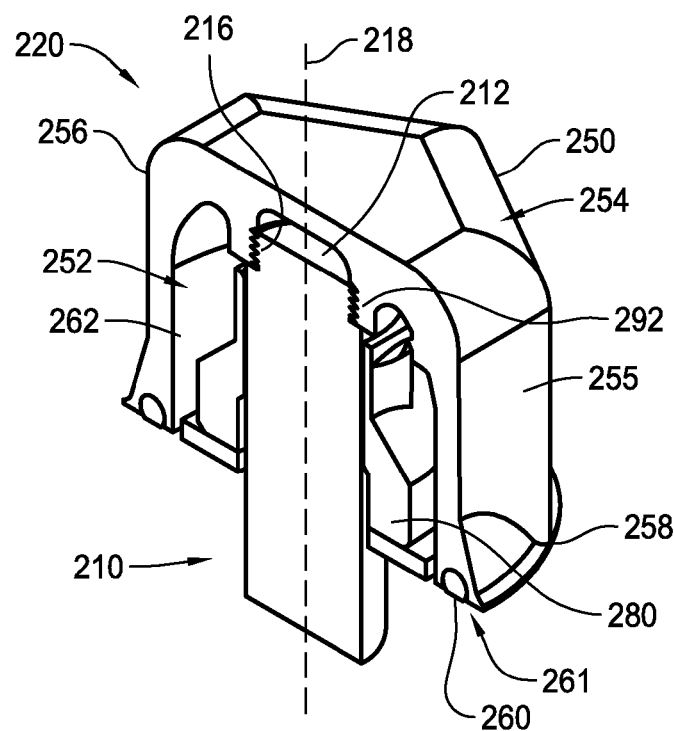
FIG. 16 is a perspective sectional view of a cap according to one aspect of the disclosure.
Figure 17:
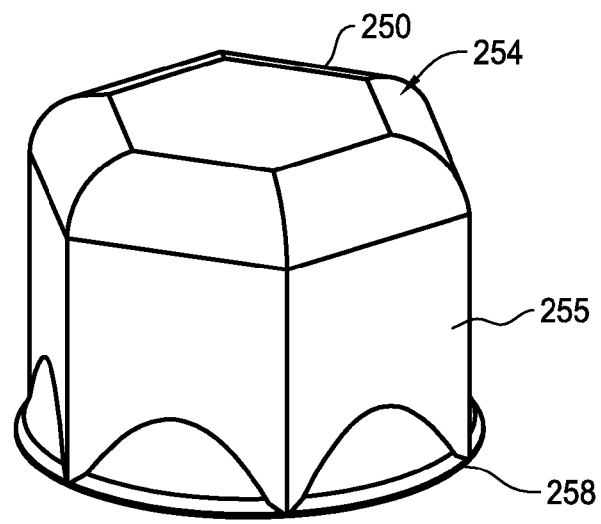
FIG. 17 is a perspective view of the cap shown in FIG. 16.
Figure 18:
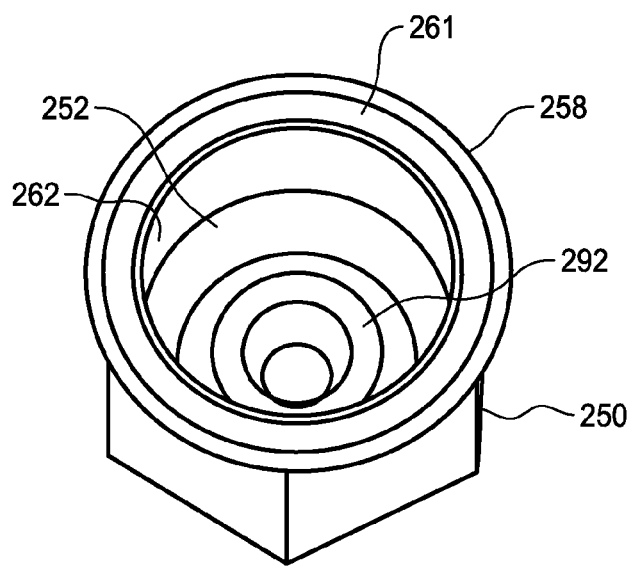
FIG. 18 is a perspective bottom view of the cap shown in FIG. 17.

In FIG. 15, lines connecting various elements and/or components of cap 250 may represent mechanical, electrical, fluid, optical, electromagnetic and other couplings and/or combinations thereof. Couplings other than those depicted in FIG. 15 may also exist. Dashed lines connecting the various elements and/or components of cap 250 may represent couplings similar in function and purpose to those represented by solid lines; however, couplings represented by the dashed lines are either selectively provided or relate to alternative or optional aspects of the disclosure. Likewise, elements and/or components of cap 250 represented in dashed lines represent alternative or optional aspects of the disclosure.

Referring to FIGS. 16-18 and 21, in one aspect, cap 250 includes exterior 254 that is partially delimited by base 258 and having a shape configured to be operable with a tool (not shown). More specifically, the shape of exterior 254 may have one or more features that enable the tool to engage and rotate cap 250 about longitudinal axis 218 such that threaded receptacle 292 may threadably engage threads 216 of fastener 210. For example, in one aspect and referring to FIG. 17, the feature(s) include at least one flat surface 255. In another aspect and referring to FIG. 21, such feature(s) include at least one projection 257. In one aspect, base 258 may also have a larger cross-sectional profile than a remainder of cap 250 to provide a lip for the tool to press against and force cap 250 towards surface 206 when covering fastener 210.

A method of covering portion 212 of fastener 210 protruding from surface 206 is also provided. Portion 212 includes threads 216. The method includes providing cap 250 that includes wall 256, base 258, interior 252 at least partially delimited by wall 256 and base 258, and threaded receptacle 292 on interior 252, threadably engaging threaded receptacle 292 with portion 212 of fastener 210, and sealing base 258 of cap 250 against surface 206.

As described above, in one aspect, cap 250 includes at least one port 270 extending through wall 256. In one aspect, the at least one port 270 may be a single port. In one aspect, the method further includes sealing base 258 against surface 206, creating a vacuum in interior 252, and injecting a sealant into interior 252. In one aspect, creating the vacuum in interior 252 includes withdrawing air from interior 252 through the single port. As such, withdrawing air from interior 252 enables the sealant to substantially fill interior 252 by limiting the formation of air pockets in interior 252.

In one implementation, an amount of sealant to be injected into interior 252 may be selected to prevent the use of excess sealant, to facilitate cleanup, and to promote a reduction in the weight of aircraft 102 (shown in FIG. 2). As such, in one aspect, injecting the sealant includes injecting a predetermined amount of sealant into interior 252 through the single port. More specifically, in one aspect, injecting a predetermined amount of sealant includes determining the predetermined amount of sealant for filling interior 252 based on a vacant volume of interior 252. In one aspect, the use of excess sealant is avoided by discontinuing to inject the sealant upon detection of a predetermined back pressure at the single port. The predetermined back pressure may be any suitable pressure selected to indicate that interior 252 has been substantially filled with sealant.

Alternatively, in one aspect, the method includes sealing base 258 against surface 206, injecting a sealant into interior 252 through the at least one port 270, and allowing air to escape from interior 252 through the at least one port 270. In one aspect, the at least one port includes injection port 272 and bleed port 274, and the sealant is injected into interior 252 through injection port 272 and the air escapes from interior 252 through bleed port 274. The sealant is then allowed to cure to facilitate coupling cap 250 to fastener 210.

Figure 20:
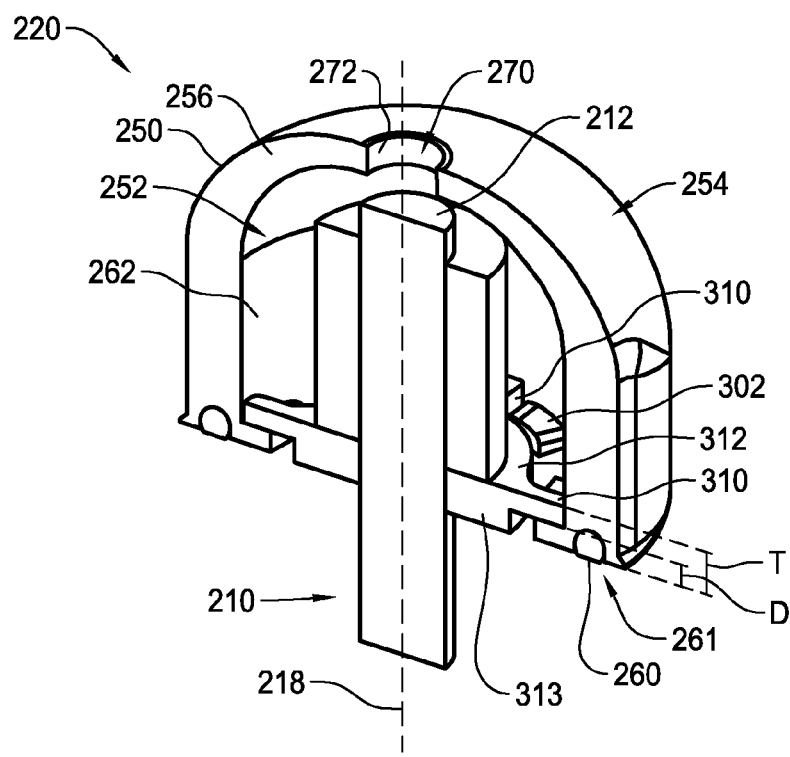
FIG. 20 is a perspective sectional view of an illustrative system of FIG. 19, according to one aspect of the disclosure.
Figure 21:
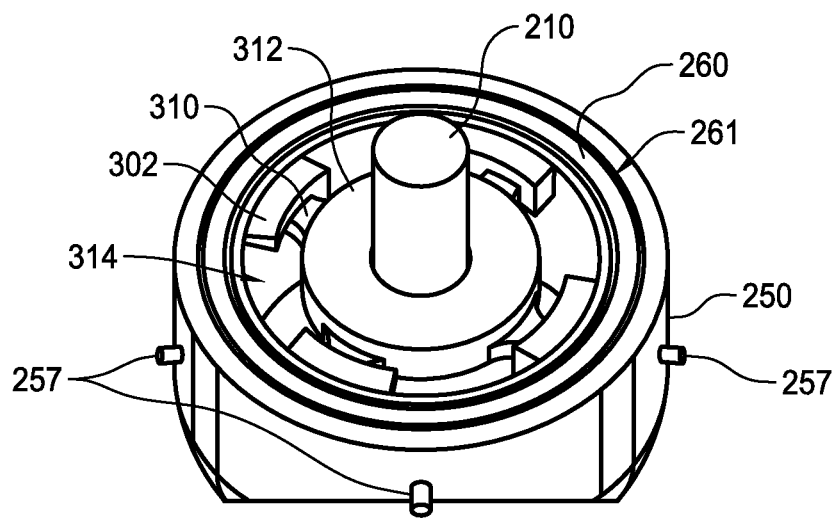
FIG. 21 is a perspective bottom view of the system shown in FIG. 20, according to one aspect of the disclosure.
Figure 22:
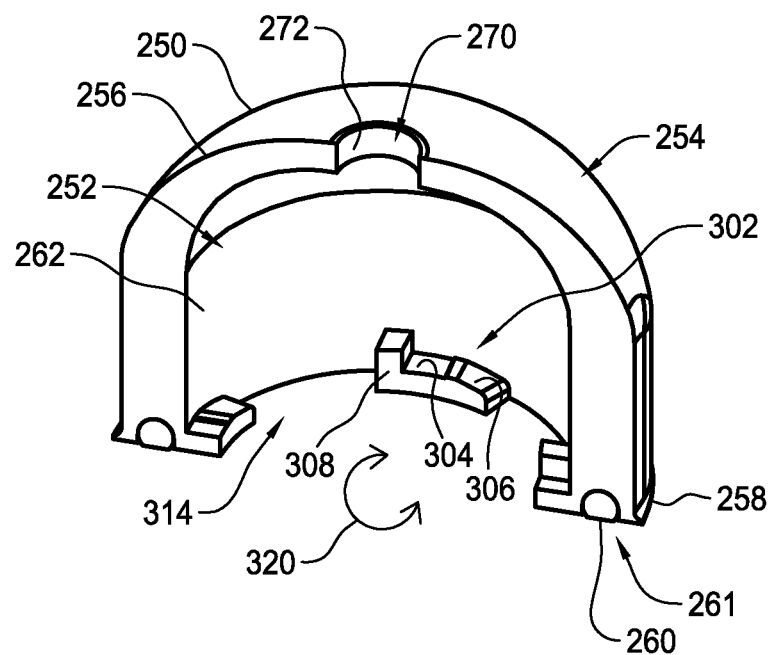
FIG. 22 is a perspective sectional view of a cap that may be used with the system shown in FIG. 20, according to one aspect of the disclosure.
Figure 23:
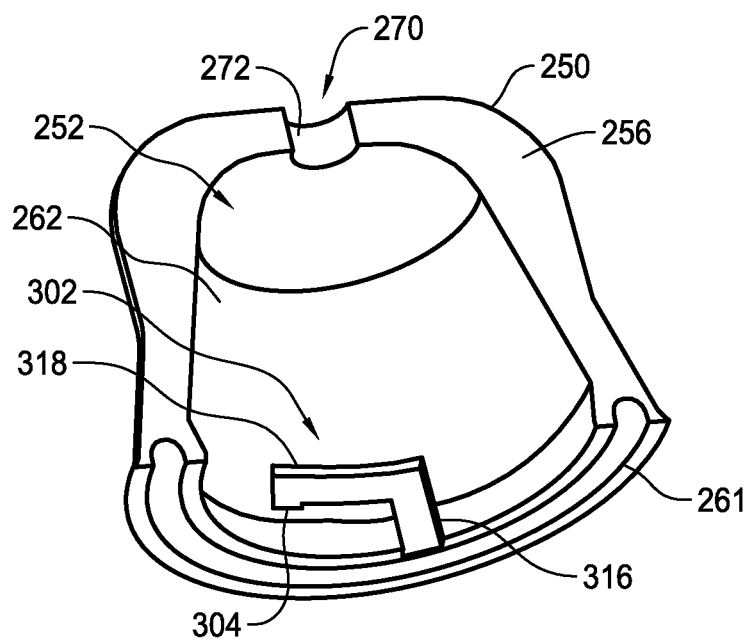
FIG. 23 is a perspective sectional view of an alternative cap that may be used with the system shown in FIG. 20, according to one aspect of the disclosure.

Referring to FIG. 19-26, one example of the disclosure relates to system 220 for use in covering portion 212 of fastener 210 protruding from surface 206 (shown in FIG. 3). The system includes cap 250 including interior 252, base 258 that at least partially delimits interior 252, and at least one cam 302 on interior 252. More specifically, cam 302 is on surface 262 of interior 252. In FIGS. 22 and 23, cam 302 includes a notch 304 and a tapered surface 306. System 220 also includes wall 256 that at least partially delimits interior 252, seal 260 coupled to base 258 to engage surface 206 (shown in FIG. 3), and at least one tab 310. In one aspect, referring to FIGS. 20 and 24, wall 256 includes at least one port 270 formed therein, and tab 310 is coupled to fastener 210 to positively engage the at least one cam 302.

Figure 19:
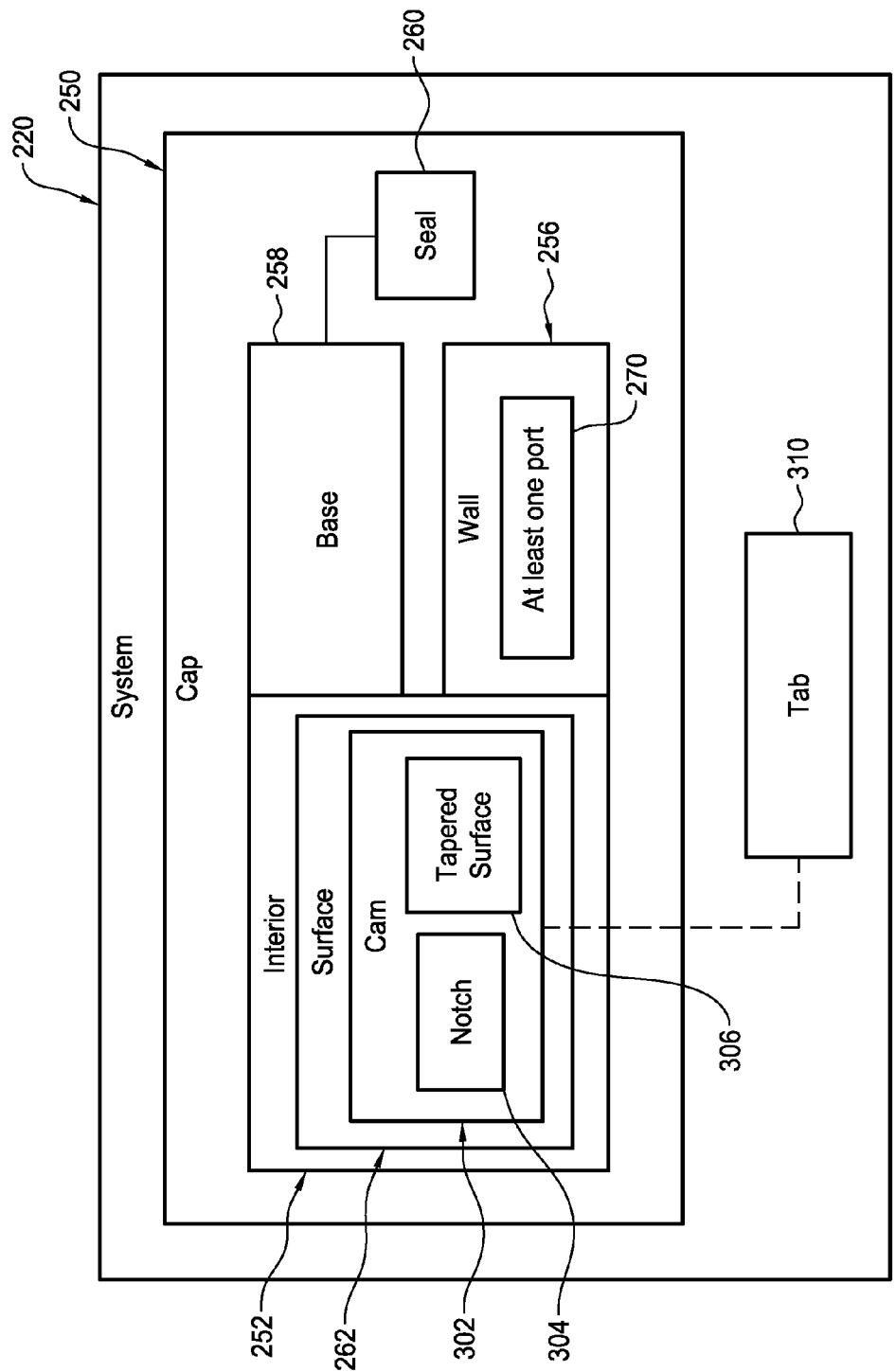
FIG. 19 is a block diagram of a system that may be used to cover a portion of the fastener shown in FIG. 3.

In FIG. 19, lines connecting various elements and/or components of system 220 may represent mechanical, electrical, fluid, optical, electromagnetic and other couplings and/or combinations thereof. Couplings other than those depicted in FIG. 19 may also exist. Dashed lines connecting the various elements and/or components of system 220 may represent couplings similar in function and purpose to those represented by solid lines; however, couplings represented by the dashed lines are either selectively provided or relate to alternative or optional aspects of the disclosure. Likewise, elements and/or components of system 220 represented in dashed lines represent alternative or optional aspects of the disclosure.

Referring to FIGS. 20-22, tab 310 may be coupled to fastener 210 using any suitable fastening mechanism. For example, in one aspect, system 220 further includes a collar 312 configured to be coupled to fastener 210. Collar 312 includes at least one tab 310. In one aspect, system 220 also includes retainer 288 configured to couple collar 312 to fastener 210. More specifically, retainer 288 is coupled to a portion 212 of fastener 210 with an interference fit to prevent movement of collar 312 along longitudinal axis 218 of fastener 210.

Figure 24:
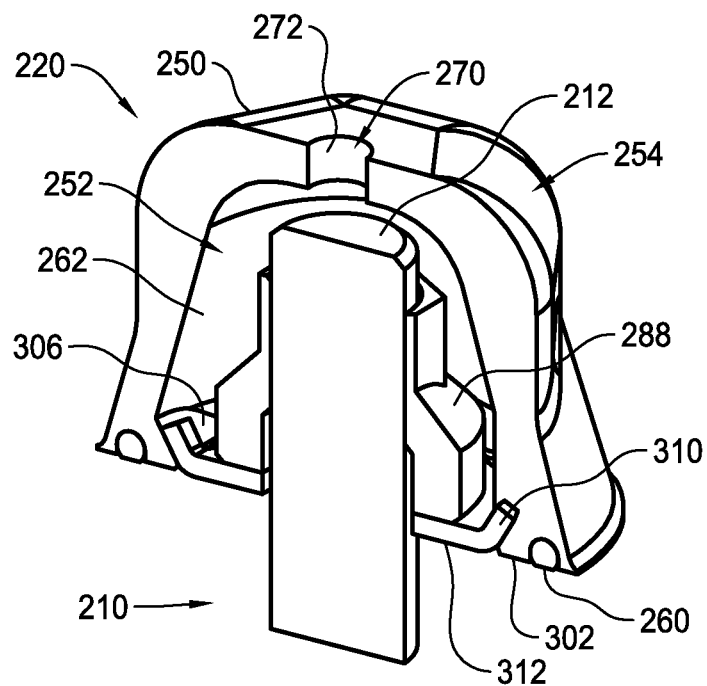
FIG. 24 is a perspective sectional view of an alternative system in accordance with FIG. 19, according to one aspect of the disclosure.
Figure 25:
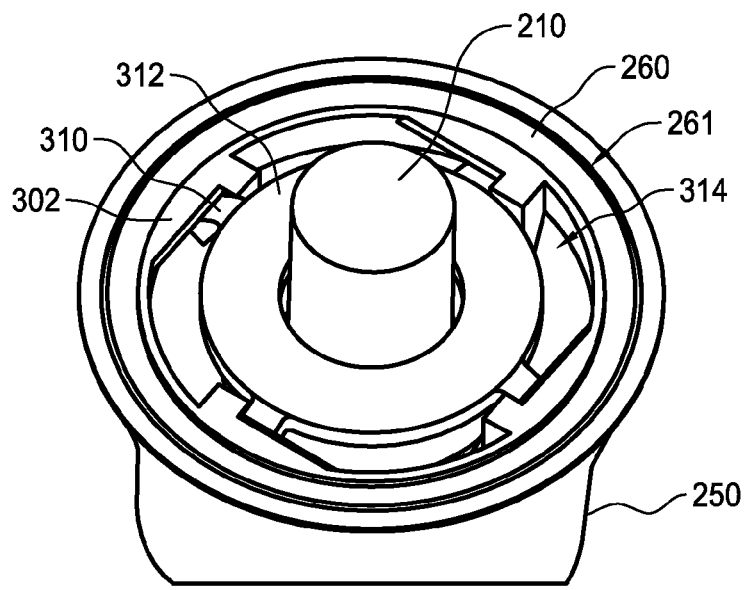
FIG. 25 is a perspective bottom view of the system shown in FIG. 24.
Figure 26:
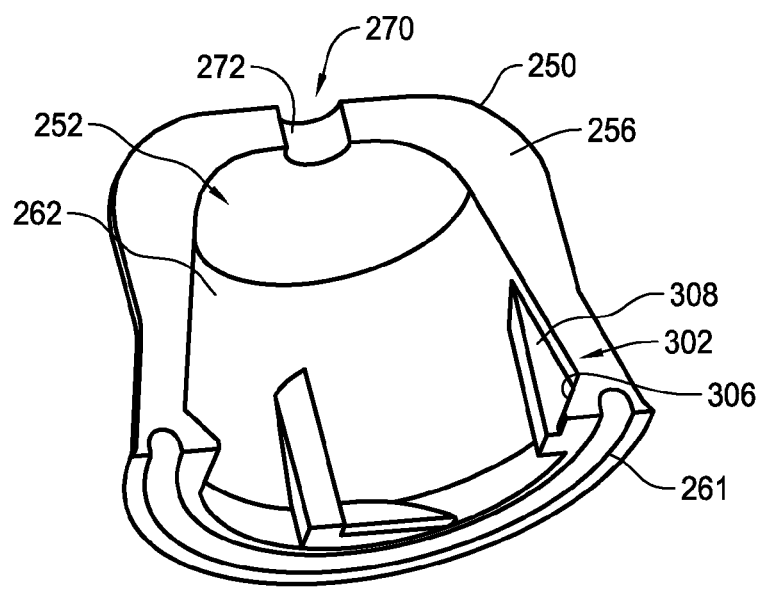
FIG. 26 is a perspective sectional view of the cap shown in FIG. 25.

Referring to FIG. 20, in one aspect, the at least one tab 310 is spaced a distance D from surface 206 (shown in FIG. 3) to enable tab 310 to engage cam 302. More specifically, a portion 313 of collar 312 has a thickness T such that tab 310 extends from surface 206 a distance D. Alternatively, in one aspect and as shown in FIGS. 24-26, the at least one tab 310 is angled away from surface 206 to enable its engagement of cam 302 without the use of a spacer. Surface 306 of cam 302 is radially inclined at substantially the same angle as tab 310 such that tab 310 mates with tapered surface 306 when fully engaged therewith.

In some aspects, the at least one cam 302 either extends from surface 262 of interior 252, as shown in FIG. 22, or is recessed in surface 262 of interior 252, as shown in FIG. 23. For example, in one aspect and referring to FIGS. 20-22, cam 302 includes tapered surface 306, a notch 304 to positively engage the at least one tab 310, and a stopper portion 308. In one aspect, tapered surface 306 faces away from base 258 of cap 250 to facilitate positive engagement between tab 310 and cam 302. The at least one cam 302 may include a plurality of cams, and tab 310 may include a plurality of tabs to be received by gaps 314 formed between adjacent cams 302. To positively engage tab 310 and cam 302, once tabs 310 are received in gaps 314, cap 250 is rotated in a direction 320. Tab 310 is sized for mating with notch 304 (shown in FIG. 22) to prevent tab 310 from backing out once engaged with cam 302.

Referring to FIG. 23, cam 302 is recessed in surface 262 of interior 252. More specifically, cam 302 includes an axial slot 316 and a transverse slot 318 extending from axial slot 316 in a circumferential direction about interior 252. Transverse slot 318 also includes notch 304 for positively engaging tab 310. In operation, tab 310 is inserted into axial slot 316 as fastener 210 is covered with cap 250. Cap 250 is then rotated in direction 320 to positively engage tab 310 and cam 302 once tab 310 is received in notch 304.

A method (shown in FIG. 30) of covering portion of fastener 210 protruding from surface 206 is also provided. The method includes providing 350 cap 250 that includes wall 256, interior 252 at least partially delimited by wall 256, and at least one cam 302 on interior 252. The method also includes coupling 352 at least one tab 310 with fastener 210, covering 354 portion 212 of fastener 210 with cap 250, and rotating 356 cap 250 to engage the at least one cam 302 with the at least one tab 310. In one aspect, rotating 356 cap 250 includes positively engaging the at least one cam 302 with the at least one tab 310.

As described above, in one aspect, cap 250 includes at least one port 270 extending through wall 256. In one aspect, the at least one port 270 may be a single port. In one aspect, the method further includes sealing base 258 against surface 206, creating a vacuum in interior 252, and injecting a sealant into interior 252. In one aspect, creating the vacuum in interior 252 includes withdrawing air from interior 252 through the single port. As such, withdrawing air from interior 252 enables the sealant to substantially fill interior 252 by limiting the formation of air pockets in interior 252.

In one implementation, an amount of sealant to be injected into interior 252 may be selected to prevent the use of excess sealant, to facilitate cleanup, and to promote a reduction in the weight of aircraft 102 (shown in FIG. 2). As such, in one aspect, injecting the sealant includes injecting a predetermined amount of sealant into interior 252 through the single port. More specifically, in one aspect, injecting a predetermined amount of sealant includes determining the predetermined amount of sealant for filling interior 252 based on a vacant volume of interior 252. In one aspect, the use of excess sealant is avoided by discontinuing to inject the sealant upon detection of a predetermined back pressure at the single port. The predetermined back pressure may be any suitable pressure selected to indicate that interior 252 has been substantially filled with sealant.

Alternatively, in one aspect, the method includes sealing base 258 against surface 206, injecting a sealant into interior 252 through the at least one port 270, and allowing air to escape from interior 252 through the at least one port 270. In one aspect, the at least one port includes injection port 272 and bleed port 274, and the sealant is injected into interior 252 through injection port 272 and the air escapes from interior 252 through bleed port 274. The sealant is then allowed to cure to facilitate coupling cap 250 to fastener 210.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in covering a portion of a fastener protruding from a surface, the system comprising:
   a cap that comprises:
      an interior surface;
      a base that at least partially delimits the interior surface; and
      pawls extending from the interior surface, each of the pawls comprising a first end proximate to the interior surface, and a second end distal from the interior surface, wherein the second ends of all the pawls are equidistant from the base; and
   a nut configured to be coupled to the fastener and comprising a tooth, wherein the pawls are configured to engage the tooth.

2. The system in accordance with claim 1, wherein the nut is configured to threadably engage the fastener.

3. The system in accordance with claim 1, wherein, when the pawls engage the tooth, the pawls are loaded in compression against the tooth.

4. The system in accordance with claim 1, wherein the cap further comprises a seal coupled to the base to engage the surface.

5. The system in accordance with claim 4, wherein the seal is configured to bias the pawls against the tooth.

6. The system in accordance with claim 1, wherein the cap further comprises:

a wall comprising the interior surface; and at least one port that extends through the wall.

7. The system in accordance with claim 6, wherein the at least one port comprises an injection port configured to receive sealant therethrough and a bleed port configured to allow air to escape from the interior.

8. The system in accordance with claim 1, wherein the tooth is delimited on one side by a groove formed in an outer surface of the nut.

9. The system in accordance with claim 1, wherein the nut is configured to be coupled to the fastener with an interference fit.

10. The system in accordance with claim 1, wherein the tooth and the surface are separated by a space.

11. The system in accordance with claim 1, wherein each of the pawls comprises a first end proximal to the base, and a second end distal from the base, wherein the second ends of the pawls are configured to engage the tooth.

12. The system in accordance with claim 11, wherein the second end has a greater width than the first end.

13. The system in accordance with claim 1, wherein the tooth includes a tapered surface facing away from a head of the fastener.

14. A system for use in covering a portion of a fastener protruding from a surface, the system comprising:

a cap that comprises:

an interior;

a base that at least partially delimits the interior; and pawls on the interior;

a collar configured to be coupled to the fastener and comprising a tooth, wherein the pawls are configured to engage the tooth in tension; and a retainer configured to couple the collar to the fastener.

15. The system in accordance with claim 14, wherein each of the pawls comprises a first end proximal to the base, and a second end distal from the base, wherein the first ends of the pawls are configured to engage the tooth.

16. The system in accordance with claim 15, wherein the first ends of the pawls are positioned in a space between the tooth and the surface when engaged with the tooth.

17. The system in accordance with claim 14, wherein, when the pawls engage the tooth, the pawls are loaded in tension.

18. The system in accordance with claim 14, wherein the cap further comprises a seal coupled to the base to engage the surface.

19. The system in accordance with claim 18, wherein the seal is configured to bias the pawls against the tooth.

20. The system in accordance with claim 14, wherein the cap further comprises:

a wall comprising the interior surface; and at least one port that extends through the wall.

* * * * *